US012679682B2

(12) United States Patent
Harada et al.

(10) Patent No.: US 12,679,682 B2
(45) Date of Patent: Jul. 14, 2026

(54) IMAGE FORMING APPARATUS AND INFORMATION PROCESSING SYSTEM

(71) Applicant: FUJIFILM Business Innovation Corp., Tokyo (JP)

(72) Inventors: Shinya Harada, Kanagawa (JP); Kenichi Miyazaki, Kanagawa (JP); Masashi Hara, Kanagawa (JP); Hitoshi Komatsu, Kanagawa (JP); Ryoji Kawaguchi, Kanagawa (JP); Tomoyasu Tanaka, Kanagawa (JP); Daiji Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/297,658

(22) Filed: Apr. 10, 2023

(65) Prior Publication Data

US 2024/0132311 A1 Apr. 25, 2024
US 2024/0228205 A9 Jul. 11, 2024

(30) Foreign Application Priority Data

Oct. 25, 2022 (JP) ................................ 2022-170405

(51) Int. Cl.
*B65H 7/06* (2006.01)
*G03G 15/00* (2006.01)

(52) U.S. Cl.
CPC ............... *B65H 7/06* (2013.01); *G03G 15/70* (2013.01); *B65H 2511/528* (2013.01); *B65H 2551/10* (2013.01); *B65H 2601/11* (2013.01)

(58) Field of Classification Search
CPC . B65H 7/06; B65H 7/20; B65H 43/04; B65H 2407/20; B65H 2511/20; B65H 2511/30; B65H 2511/528; B65H 2513/512; B65H 2551/10; B65H 2551/20; B65H 2551/26; B65H 2601/11; G03G 15/70; G03G 21/1638
See application file for complete search history.

(56) References Cited

U.S. PATENT DOCUMENTS

| | | | | | |
|---|---|---|---|---|---|
| 5,034,770 | A * | 7/1991 | O'Connell | G03G 15/5012 399/19 |
| 2005/0123309 | A1* | 6/2005 | Coriale | G03G 15/70 399/21 |
| 2007/0092271 | A1* | 4/2007 | Sayama | G03G 15/70 399/21 |
| 2010/0164171 | A1* | 7/2010 | Feng | B65H 43/00 271/264 |

FOREIGN PATENT DOCUMENTS

JP 2006171371 6/2006

* cited by examiner

*Primary Examiner* — Prasad V Gokhale
(74) *Attorney, Agent, or Firm* — JCIPRNET

(57) ABSTRACT

An image forming apparatus includes a transport section that transports a recording material, a grasping section that grasps a remaining situation of a recording material remaining in a transport path through which the recording material is transported by the transport section, a reception section that receives, from a user, an input of the number of removed sheets of recording material removed from the transport path by the user in a case where the transport of the recording material by the transport section is stopped, and a start section that starts the stopped transport by the transport section based on the number of removed sheets input by the user.

17 Claims, 20 Drawing Sheets

FIG. 5

| Zone NAME | NUMBER OF REMAINING SHEETS | Area NAME | NUMBER OF REMAINING SHEETS |
|---|---|---|---|
| Z1 | 0 | A1 | 2 |
| Z2 | 0 | | |
| Z3 | 0 | | |
| Z4 | 0 | | |
| Z5 | 0 | | |
| Z6 | 1 | | |
| Z7 | 1 | | |
| Z8 | 3 | A2 | 6 |
| Z9 | 0 | | |
| Z10 | 3 | | |
| Z11 | 1 | A3 | 1 |
| Z12 | 0 | | |
| Z13 | 0 | | |
| Z14 | 0 | | |
| Z15 | 0 | | |
| Z16 | 0 | | |

FIG. 16

| Zone NAME | NUMBER OF REMAINING SHEETS | NUMBER OF REMOVED SHEETS | Area NAME | NUMBER OF REMAINING SHEETS | NUMBER OF REMOVED SHEETS |
|---|---|---|---|---|---|
| Z1 | 0 | 0 | A1 | 2 | 2 |
| Z2 | 0 | 0 | | | |
| Z3 | 0 | 0 | | | |
| Z4 | 0 | 0 | | | |
| Z5 | 0 | 1 | | | |
| Z6 | 1 | 0 | | | |
| Z7 | 1 | 1 | | | |
| Z8 | 3 | 3 | A2 | 6 | 6 |
| Z9 | 0 | 1 | | | |
| Z10 | 3 | 2 | | | |
| Z11 | 1 | 0 | A3 | 1 | 1 |
| Z12 | 0 | 1 | | | |
| Z13 | 0 | 0 | | | |
| Z14 | 0 | 0 | | | |
| Z15 | 0 | 0 | | | |
| Z16 | 0 | 0 | | | |

FIG. 17

| Zone NAME | NUMBER OF REMAINING SHEETS | NUMBER OF REMOVED SHEETS | Area NAME | NUMBER OF REMAINING SHEETS | NUMBER OF REMOVED SHEETS |
|---|---|---|---|---|---|
| Z1 | 0 | 0 | A1 | 2 | 4 |
| Z2 | 0 | 0 | | | |
| Z3 | 0 | 0 | | | |
| Z4 | 0 | 0 | | | |
| Z5 | 0 | 0 | | | |
| Z6 | 1 | 2 | | | |
| Z7 | 1 | 2 | | | |
| Z8 | 3 | 2 | A2 | 6 | 4 |
| Z9 | 0 | 1 | | | |
| Z10 | 3 | 1 | | | |
| Z11 | 1 | 0 | A3 | 1 | 1 |
| Z12 | 0 | 1 | | | |
| Z13 | 0 | 0 | | | |
| Z14 | 0 | 0 | | | |
| Z15 | 0 | 0 | | | |
| Z16 | 0 | 0 | | | |

IMAGE FORMING APPARATUS AND INFORMATION PROCESSING SYSTEM

CROSS-REFERENCE TO RELATED APPLICATIONS

This application is based on and claims priority under 35 USC 119 from Japanese Patent Application No. 2022-170405 filed Oct. 25, 2022.

BACKGROUND

(i) Technical Field

The present invention relates to an image forming apparatus and an information processing system.

(ii) Related Art

JP2006-171371A discloses an image forming apparatus including a paper feed sensor that detects fed paper and integrates the number of sheets of paper, a paper discharge sensor that detects discharged paper and integrates the number of sheets of paper, a type detection section that detects a type of paper and/or an input section that inputs the type of paper, and a storage section that stores a portion where the paper is frequently jammed in correspondence with the type of paper. JP2006-171371A discloses that the number of sheets of paper remaining in the image forming apparatus when the paper is jammed and the portion where the paper is frequently jammed are displayed, from the type of paper detected or input, on a display apparatus.

SUMMARY

For example, in the image forming apparatus, in a case where a recording material is jammed and transport is stopped, the number of recording materials remaining in the image forming apparatus may be displayed on a display unit.

However, even in a case where the number of recording materials remaining in the image forming apparatus is displayed, there is a case where a user attempts to restart the transport without removing the displayed number of recording materials. In the above case, the restart of the image forming apparatus may be stopped or the transport may be stopped again due to the recording material remaining without being removed.

Aspects of non-limiting embodiments of the present disclosure relate to an image forming apparatus and an information processing system that suppress, in a case where transport is stopped due to jamming of a recording material, the transport stop again, as compared with a configuration in which a user does not input the number of removed recording materials.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a transport section that transports a recording material, a grasping section that grasps a remaining situation of a recording material remaining in a transport path through which the recording material is transported by the transport section, a reception section that receives, from a user, an input of the number of removed sheets of recording material removed from the transport path by the user in a case where the transport of the recording material by the transport section is stopped, and a start section that starts the stopped transport by the transport section based on the number of removed sheets input by the user.

BRIEF DESCRIPTION OF THE DRAWINGS

Exemplary embodiment(s) of the present invention will be described in detail based on the following figures, wherein:

FIG. 5 is a table showing an example of a remaining situation of residual paper;

FIG. 16 is a table showing an example of input information and prediction information;

FIG. 17 is a table showing another example of the input information and the prediction information;

DETAILED DESCRIPTION

Hereinafter, exemplary embodiments of the present invention will be described in detail with reference to accompanying drawings.

Figure 1:
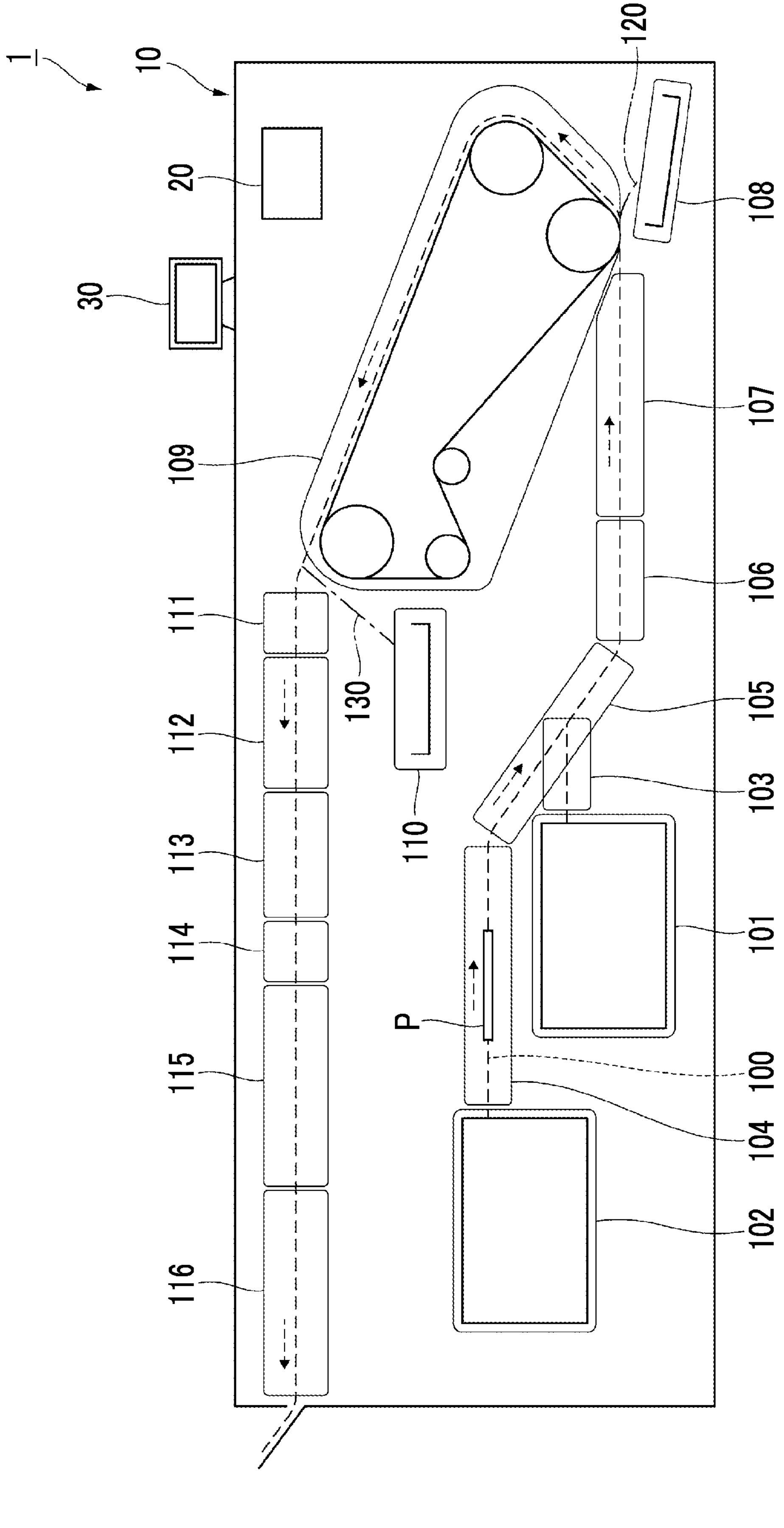
FIG. 1 is a diagram showing an example of a configuration of an information processing system according to the present exemplary embodiment.

FIG. 1 is a diagram showing an example of a configuration of an information processing system 1 according to the present exemplary embodiment.

The information processing system 1 of the present exemplary embodiment is provided with an image forming apparatus 10 that forms an image on paper P, which is an example of a recording material, based on a print job.

The image forming apparatus 10 as an example of a transport apparatus includes a transport apparatus 100 that supplies and transports the paper P, and a first collection apparatus 120 and a second collection apparatus 130 that collect the transported paper P. Further, the image forming apparatus 10 includes an information processing apparatus 20 that processes information related to the transport of the paper P and a display apparatus 30 that displays the information to a user.

In the case of the present exemplary embodiment, the image forming apparatus 10 has a basic function used for forming the image on the paper P, for example. Further, the image forming apparatus 10 may have, for example, a communication function capable of connecting to the Internet via a wide area network (WAN) or a local area network (LAN) or a communication function capable of connecting to a telephone network.

In the present exemplary embodiment, the print job is information including a data file of a document designated as a print target and transport information for setting a transport condition and the like of the paper P on which the image is formed in printing the document.

Further, the document may include the image in addition to a text, or may include only the image without including the text. The document data file may include not only image data or document data, but also attribute information, such as an update date and time of an electronic document, a paper size, the number of pages, and a keyword in the electronic document, or image information used in a case where the document data is converted into the image. Further, the transport information may include not only paper information such as a paper type, basis weight, and paper length of the paper P, but also information on an image processing condition used for deciding one-sided printing, two-sided printing, or the like or a transport speed at which the paper P is transported.

The transport apparatus 100 shown in FIG. 1 has a first paper storage unit 101 and a second paper storage unit 102 that store the paper P. Further, the transport apparatus 100 is provided with a first paper feed unit 103, a second paper feed unit 104, a first transport unit 105, a pre-registration unit 106, a registration unit 107, an image forming unit 109, a second transport unit 111, a cooling unit 112, a detection unit 113, a third transport unit 114, a fourth transport unit 115, and a fifth transport unit 116.

The image forming unit 109 includes, for example, a tandem image forming unit and a fixing unit that fixes a toner image formed on the paper P. The image forming unit may form the image on the paper P by using another method such as an inkjet method.

Further, the detection unit 113 is a so-called in line sensor (ILS) that optically detects the image fixed on the paper P for adjustment processing such as color calibration, front-back registration adjustment, transfer output adjustment, in-plane unevenness correction, or automatic gradation correction.

The paper P transported from the first paper storage unit 101 and the second paper storage unit 102 is a sheet-shaped recording material such as A4 size or B5 size.

The paper P is selectively taken out from the first paper storage unit 101 and the second paper storage unit 102 by the first paper feed unit 103 and the second paper feed unit 104 to be transported via the first transport unit 105. Thereafter, the transport is temporarily stopped by the pre-registration unit 106 to absorb a variation in delivery to the registration unit 107. Further, the transport of the paper P discharged from the pre-registration unit 106 is temporarily stopped at the registration unit 107, and then the paper P is transported to the image forming unit 109 at a predetermined timing. The paper P discharged from the image forming unit 109 is cooled by the cooling unit 112, and the detection unit 113 detects the image fixed on the paper P. Further, the paper P discharged from the detection unit 113 is discharged to the outside of the image forming apparatus 10 via the third transport unit 114, the fourth transport unit 115, and the fifth transport unit 116.

The image forming apparatus 10 is provided with a plurality of paper detection sensors (not shown), and the sensors are disposed in a state where positions of the sensors in a paper transport direction are displaced from each other. In the case of the present exemplary embodiment, the paper detection sensor is disposed in correspondence with each unit except the image forming unit 109.

Further, in the image forming apparatus 10, the first collection apparatus 120 has a first collection storage unit 108, and the second collection apparatus 130 has a second collection storage unit 110. In the case of the present exemplary embodiment, the paper detection sensor is disposed in the first collection storage unit 108 and the second collection storage unit 110.

In a case where the transport of the paper P is stopped, the paper P in the image forming unit 109 in which the paper detection sensor is not disposed is not transported toward the second transport unit 111 and is collected in the first collection storage unit 108 or the second collection storage unit 110.

The transport apparatus 100 that transports the paper P to the outside of the image forming apparatus 10 and the first collection apparatus 120 and the second collection apparatus 130 that collect the paper P inside the image forming apparatus 10 are examples of a transport section that transports the paper P along a transport path.

In the present exemplary embodiment, a case where the sheet-shaped paper P is set in the image forming apparatus 10 has been illustrated, but the present invention is not limited thereto. For example, a roll-shaped recording material may be set in the image forming apparatus 10, and recording materials sequentially cut into a rectangular shape may be sequentially supplied.

The information processing apparatus 20 controls the image forming apparatus 10 via a communication line (not shown) to perform various pieces of deciding related to the transport of the paper P.

The display apparatus 30 is configured by, for example, a liquid crystal display or an organic EL display and displays information notified to the user who uses the image forming apparatus 10. In the present exemplary embodiment, the display apparatus 30 is configured by a so-called touch panel and receives not only the information display but also a user operation. The display apparatus 30 may be used by being removed from the image forming apparatus 10.

The image forming apparatus 10 of the present exemplary embodiment is located on an outer surface of the image forming apparatus 10 and is provided with a covering member that serves as an exterior member. Accordingly, in a case where the covering member is opened, the user can visually recognize each unit shown in FIG. 1.

Further, the image forming apparatus 10 is provided with an opening and closing detection sensor (not shown) that detects opening and closing of the covering member.

In the present exemplary embodiment, in a case where the image forming apparatus 10 detects jamming of the paper P, the transport of the paper P by the transport apparatus 100 is stopped.

In addition, in the present exemplary embodiment, in a case where the paper detection sensor does not detect the paper P at a timing predicted based on the transport information included in the print job, the paper P is determined to be jammed in the image forming apparatus 10.

In the above case, the information processing apparatus 20 outputs a stop signal to the transport apparatus 100, and thus the transport of the paper P by the transport apparatus 100 is stopped.

In the present specification, there is a case where interruption of an operation of the image forming apparatus 10, such as the transport of the paper P, due to the jamming of the paper P in the image forming apparatus 10 is referred to as "jam".

Further, in a case where the jam occurs in the image forming apparatus 10, jam information for specifying the jam is generated.

The jam information includes a "jam name", a "cause point", and a "stop method". Further, the jam information includes a "remaining point".

The term "jam name" is a specific name of the jam and is a name for managing each type of j am. Further, the term "cause point" is a specific point where the jam has occurred and is a point where the paper P is jammed. Further, the term "stop method" is a specific method in which the transport apparatus 100 stops the transport of the paper P. Examples of the "stop method" include a method of stopping the transport after paper P remaining in the image forming apparatus 10 (hereinafter referred to as "residual paper P") is transported to the outside of the image forming apparatus 10 or to the first collection storage unit 108 and the second collection storage unit 110 and a method of immediately stopping the transport without the transport of the residual paper P.

In the following, a case is assumed in which in a case where the jam occurs in the image forming apparatus 10, the user opens the covering member of the image forming apparatus 10 and removes the residual paper P remaining in the image forming apparatus 10.

The image forming apparatus 10 to which the information processing system 1 of the present exemplary embodiment is applied acquires input information that is information including the number of sheets of the residual paper P removed by the user (hereinafter referred to as "number of removed sheets") from the inside of the image forming apparatus 10, which is input by the user. The image forming apparatus 10 starts the stopped transport of the paper P based on the acquired input information.

With the above function of the image forming apparatus 10 of the present exemplary embodiment, whether or not to start the stopped transport of the paper P is decided after the number of removed sheets of the residual paper P actually removed from the inside of the image forming apparatus 10 by the user is grasped. Specifically, according to the present exemplary embodiment, in a case where the transport of the paper P is predicted to be stopped again from the number of removed sheets of the residual paper P actually removed by the user, the transport of the paper P is not started.

In the present exemplary embodiment, the transport of the paper P is prevented from being stopped again due to the start of the transport of the paper P without removal of the predicted number of sheets of the residual paper P by the user.

Figure 2:
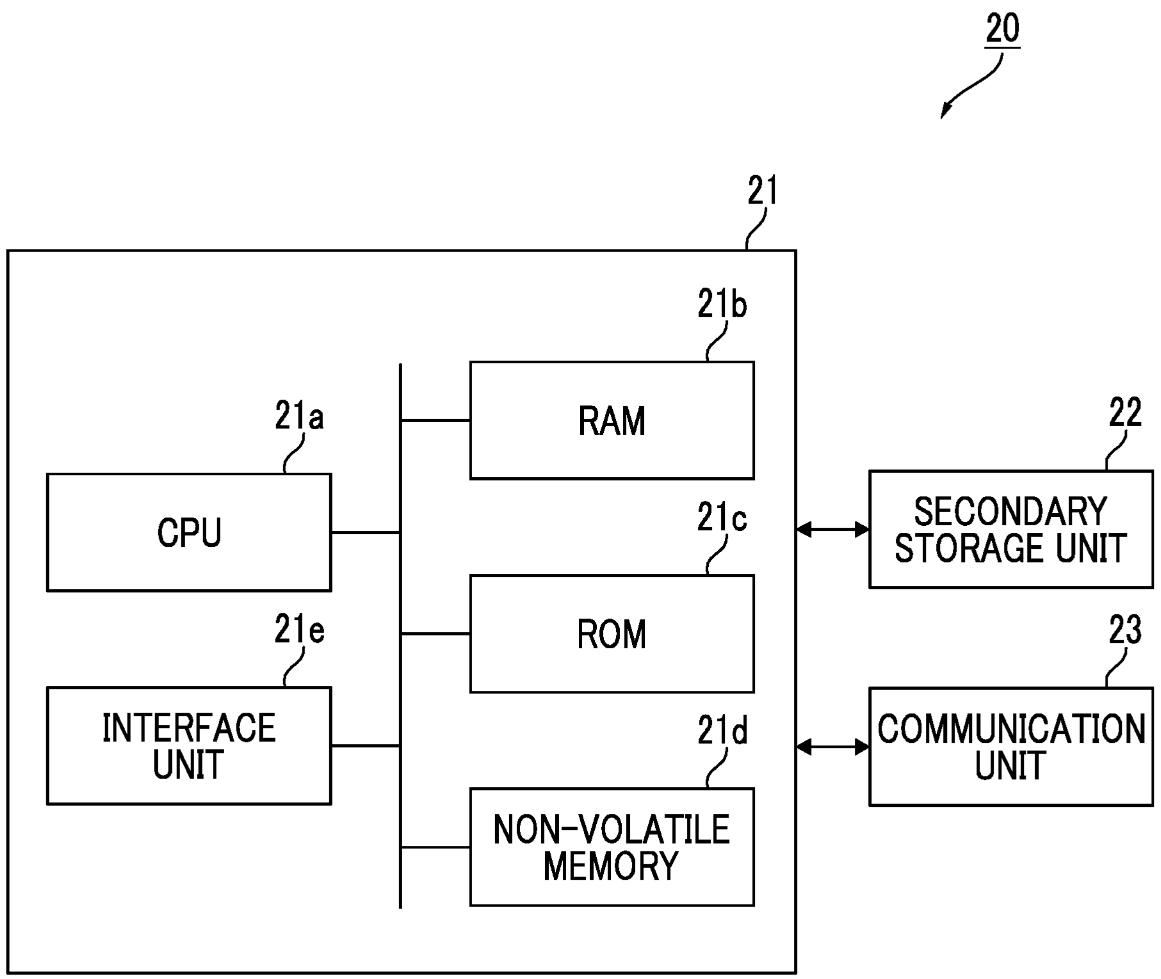
FIG. 2 is a diagram for describing a hardware configuration of an information processing apparatus according to the present exemplary embodiment.

FIG. 2 is a diagram for describing a hardware configuration of the information processing apparatus 20 according to the present exemplary embodiment.

The information processing apparatus 20 includes a control unit 21 that controls the operation of the entire image forming apparatus 10, a secondary storage unit 22 that stores image data and the like, and a communication unit 23 that realizes communication with another apparatus.

The secondary storage unit 22 is formed by an existing information storage apparatus such as a hard disk drive (HDD), a semiconductor memory, or a magnetic tape.

The control unit 21 is provided with a CPU 21*a* as an example of a processor. In the present exemplary embodiment, the CPU 21*a* executes each piece of processing described below.

Further, the control unit 21 includes a RAM 21*b* used as a work memory or the like of the CPU 21*a* and a ROM 21*c* in which a program executed by the CPU 21*a* and the like are stored.

Further, the control unit 21 includes a non-volatile memory 21*d* that is configured in a rewritable manner and can hold data even in a case where power supply is interrupted, and an interface unit 21*e* that controls each unit such as a communication unit 23 connected to the control unit 21.

The non-volatile memory 21*d* is configured by, for example, an SRAM or a flash memory backed up by a battery.

In the present exemplary embodiment, the control unit 21 reads the program stored in the secondary storage unit 22 or the ROM 21*c* to execute each piece of processing described below.

The control unit 21, the secondary storage unit 22, and the communication unit 23 are connected to each other through a bus or a signal line.

Figure 3:
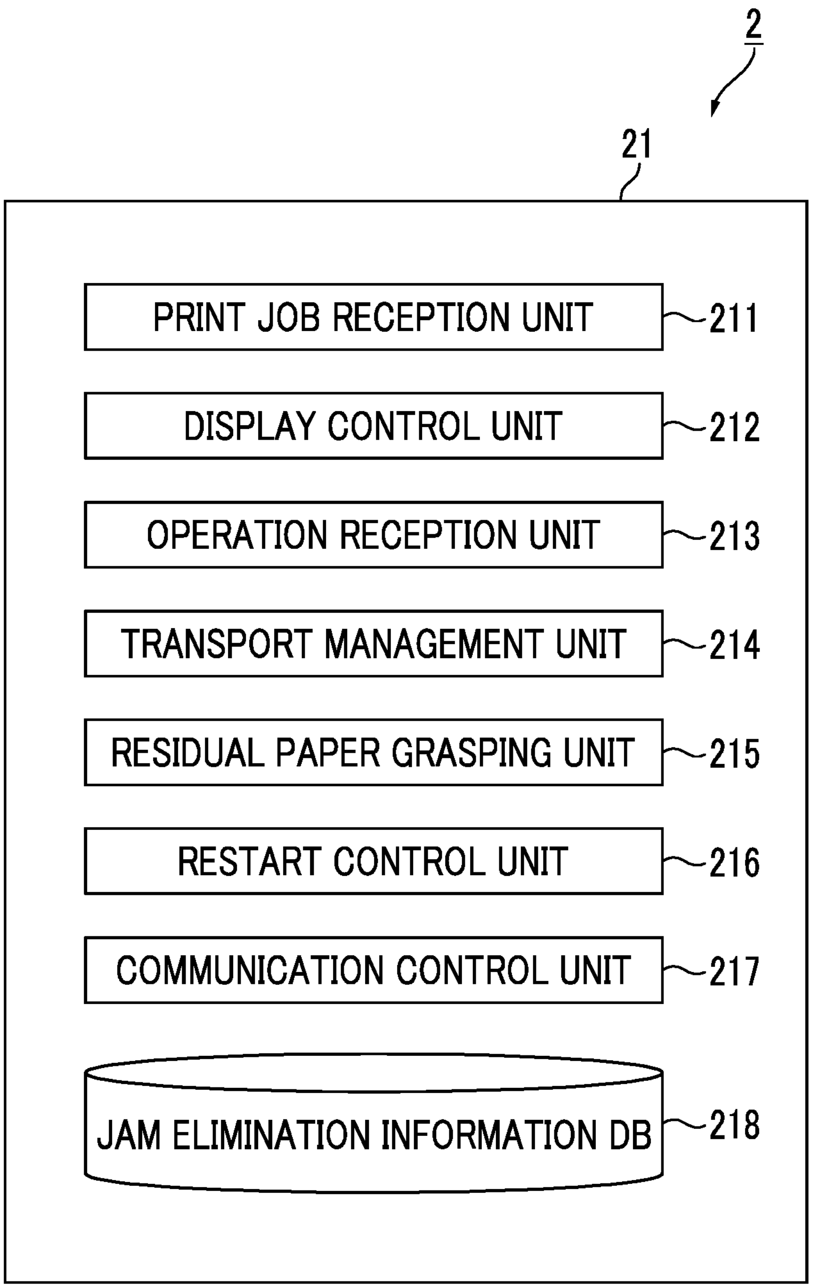
FIG. 3 is a diagram showing an example of a functional configuration of an image forming apparatus according to the present exemplary embodiment.

FIG. 3 is a diagram showing an example of a functional configuration of the image forming apparatus 10 according to the present exemplary embodiment.

The image forming apparatus 10 in the present exemplary embodiment has functions of a print job reception unit 211, a display control unit 212, an operation reception unit 213, a transport management unit 214, a residual paper grasping unit 215, a restart control unit 216, and a communication control unit 217. Further, the image forming apparatus 10 has a function of a jam elimination information database (DB) 218.

The print job reception unit 211 executes reception processing of the print job. Specifically, the print job reception unit 211 manages the print job received by the communication unit 23 (refer to FIG. 2).

The display control unit 212 as an example of a display control section controls the display of the image displayed on the display apparatus 30 (refer to FIG. 1). The display control unit 212 controls display of an image for issuing notification of the jam occurring during execution of the print job, and display of an image that receives an input of the number of removed sheets of the residual paper P removed from the transport path by the user.

Here, the display in the display apparatus 30 will be described.

Figure 4:
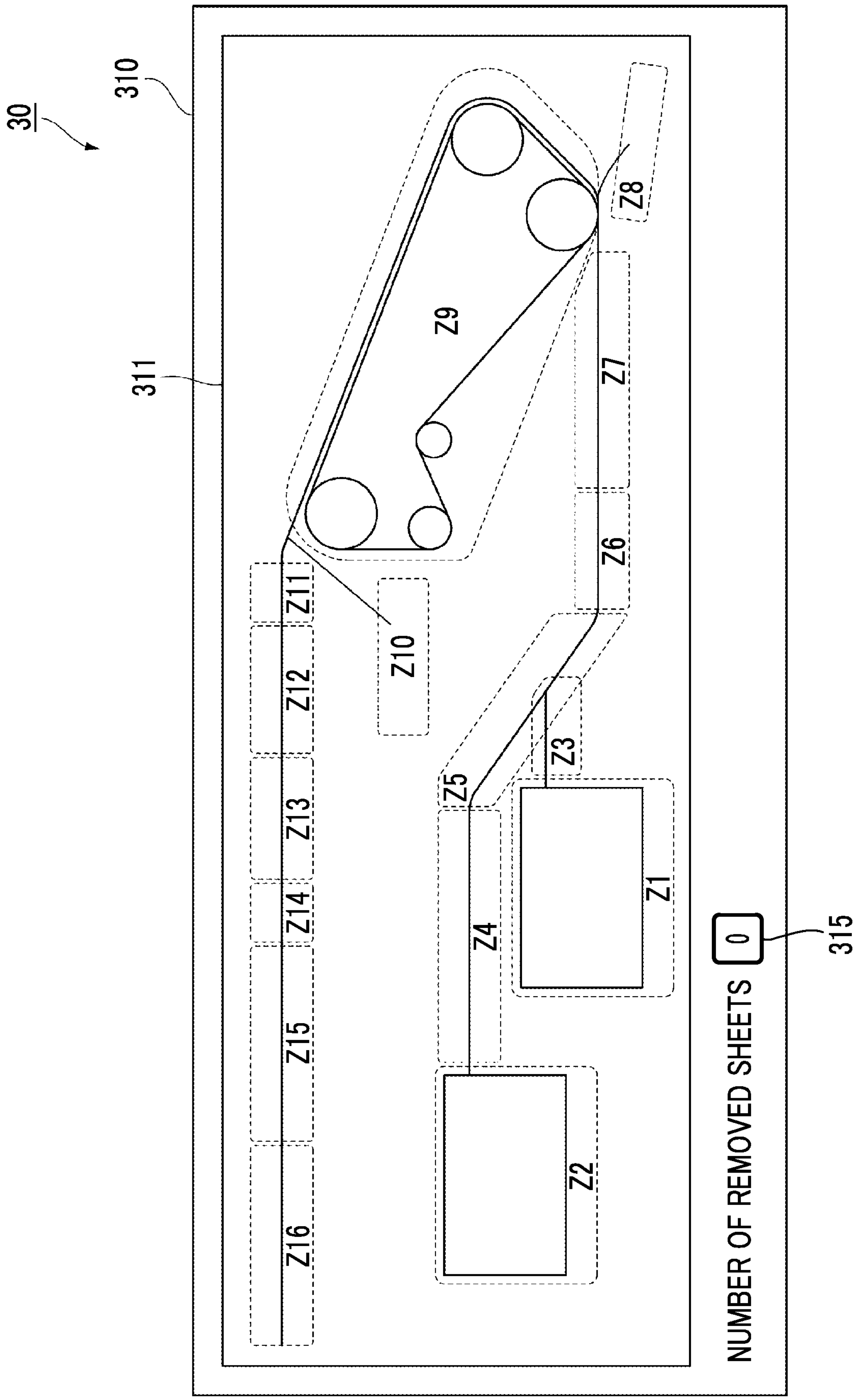
FIG. 4 is a diagram showing an example of an operation screen according to the present exemplary embodiment.

FIG. 4 is a diagram showing an example of an operation screen 310 according to the present exemplary embodiment.

The operation screen 310 is a screen that receives the user operation. Specifically, the operation screen 310 is a screen that issues notification of information indicating the remaining situation of the residual paper P and receives the input of the number of removed sheets of the residual paper P removed by the user.

In the display example shown in FIG. 4, the operation screen 310 displays a remaining situation image 311 and an input field 315.

The remaining situation image 311 is an image for issuing notification of the remaining situation of the residual paper P remaining in the image forming apparatus 10 and for issuing notification of the stopping of the transport of the paper P.

The remaining situation image 311 is a schematic diagram in which the transport path of the paper P is divided into areas indicated by Z1 to Z16 for the inside of the image forming apparatus 10 in correspondence with each unit shown in FIG. 1.

The display modes of Z1 to Z16 are changed to indicate a point where the residual paper P remains, which will be described in detail below.

In the display example shown in FIG. 4, the area indicated by Z1 corresponds to the first paper storage unit 101, and the area indicated by Z2 corresponds to the second paper storage unit 102. Further, Z3 corresponds to the first paper feed unit 103, Z4 corresponds to the second paper feed unit 104, and Z5 corresponds to the first transport unit 105. Z6 corresponds to the pre-registration unit 106, and Z7 corresponds to the registration unit 107. Z8 corresponds to the first collection storage unit 108, Z9 corresponds to the image forming unit 109, and Z10 corresponds to the second collection storage unit 110. Z8 corresponds to the first collection storage unit 108, Z9 corresponds to the image forming unit 109, and Z10 corresponds to the second collection storage unit 110. Z11 corresponds to the second transport unit 111, Z12 corresponds to the cooling unit 112, and Z13 corresponds to the detection unit 113. Z14 corresponds to the third transport unit 114, Z15 corresponds to the fourth transport unit 115, and Z16 corresponds to the fifth transport unit 116.

Each of the areas indicated by Z1 to Z16 is an example of the point.

The input field 315 is an area where the input of the number of removed sheets of the residual paper P removed by the user is received.

In the display example shown in FIG. 4, the input field 315 receives the input of a total number of removed sheets of the residual paper P removed from the transport path in the image forming apparatus 10.

Returning to the description of FIG. 3.

The operation reception unit 213 as an example of a reception section executes the reception processing of an operation performed by the user. Specifically, the operation reception unit 213 receives an instruction from the user in response to an operation by the user via the display apparatus 30 (refer to FIG. 1) or the like.

For example, in a case where the transport of the paper P by the transport apparatus 100 is stopped, the operation reception unit 213 receives, from the user, the input of the number of removed sheets of the residual paper P removed from the transport path via the display apparatus 30.

The operation reception unit 213 may receive the instruction from the user in response to the operation by the user via a mobile terminal apparatus owned by the user, in addition to the display apparatus 30.

The transport management unit 214 manages the transport of the paper P by the transport apparatus 100, the first collection apparatus 120, and the second collection apparatus 130.

The transport management unit 214 reads out the print job received from the secondary storage unit 22 (refer to FIG. 2) and decides the transport condition of the paper P in executing the print job.

As described above, the print job is configured of the document data file and the transport information. The transport management unit 214 decides an interval between sheets of the paper P transported by the transport apparatus 100, based on the paper information of the paper P and the transport speed at which the paper P is transported among the transport information included in the print job. As the interval between the sheets, for example, a distance between sheets of the paper P transported or a timing at which each sheet of the paper P is loaded from the first paper storage unit 101 and the second paper storage unit 102 into the transport path is decided.

In a case where the paper P is jammed in the image forming apparatus 10, the transport management unit 214 stops the transport of the paper P by the transport apparatus 100. Specifically, in a case where the paper P is not detected by the paper detection sensor at a timing predicted based on the transport information, the transport management unit 214 outputs the stop signal to the transport apparatus 100.

Further, in a case where the jam has occurred, the transport management unit 214 collects the residual paper P of the image forming unit 109 in the first collection storage unit 108 or the second collection storage unit 110. Thus, the collection by the first collection apparatus 120 or the second collection apparatus 130 is started.

The residual paper grasping unit 215 as an example of a grasping section grasps the remaining situation of the residual paper P remaining in the image forming apparatus 10. Specifically, the residual paper grasping unit 215 specifies the remaining situation of the residual paper P based on at least one of information acquired from the paper detection sensor, the transport information when the residual paper P is transported, jam information, or jam elimination information described below.

In other words, the residual paper grasping unit 215 predicts the remaining situation as an example of prediction information based on at least one of the information acquired from the paper detection sensor, the transport information when the residual paper P is transported, the jam information, and the jam elimination information.

For example, the residual paper grasping unit 215 grasps the number of remaining sheets of the residual paper P in the image forming apparatus 10 as the remaining situation of the residual paper P. The number of remaining sheets of the residual paper P remaining in the image forming apparatus 10 is the number of sheets indicating a difference between the number of sheets of the paper P placed on the transport path from the first paper storage unit 101 and the second paper storage unit 102 and the number of sheets of the paper P discharged from the fifth transport unit 116.

In addition, for example, the residual paper grasping unit 215 may grasp the number of remaining sheets of the residual paper P remaining in the image forming apparatus 10 as well as the remaining point where the residual paper P remains, as the remaining situation of the residual paper P.

Further, the residual paper grasping unit 215 may grasp the number of remaining sheets of the residual paper P for each remaining point where the residual paper P remains.

FIG. 5 is a table showing an example of the remaining situation of the residual paper P. FIG. 5 shows a case where the jam has occurred in Z11 (refer to FIG. 4) corresponding to the second transport unit 111 (refer to FIG. 1), as an example.

In the example shown in FIG. 5, "Zone name" that is a specific name of a predetermined point in the transport path of the paper P and "Number of remaining sheets" the is the specific number of sheets of the residual paper P for each point are grasped as the remaining situation of the residual paper P.

The number of remaining sheets of the residual paper P for each remaining point is, for example, the number of sheets indicating a difference between the number of sheets detected at one remaining point and the number of sheets of the paper P detected at another remaining point where the paper P is transported next to the one remaining point. In other words, the number of remaining sheets of the residual paper P for each remaining point is, for example, the number of sheets indicating a difference between the number of sheets of the paper P transported to one remaining point and the number of sheets of the paper P discharged from the one remaining point.

Further, the residual paper grasping unit 215 may grasp a remaining range, which is a wider range than the point, as the remaining situation of the residual paper P. The range is a predetermined area formed by aggregation of a plurality of points. In other words, the range is a range in which the user can check the plurality of points by performing a series of operations.

Specifically, the residual paper grasping unit 215 may grasp a range in which the residual paper P can be collectively removed in a case where the user opens one covering member, which is the remaining range in which the residual paper P remains. In other words, the residual paper grasping unit 215 may grasp a range that the user can reach in a case where the covering member in one area is opened, which is the remaining range in which the residual paper P remains. Further, the residual paper grasping unit 215 may grasp the number of remaining sheets of the residual paper P for each remaining range as the remaining situation of the residual paper P.

In the above case, as shown in FIG. 5, "Area name" that is a specific name of a predetermined range in the transport path of the paper P and "Number of remaining sheets" that is the specific number of sheets of the residual paper P for each range P, as the remaining situation of the residual paper P.

In the example shown in FIG. 5, the transport path of the paper P is divided into A1, A2, and A3 as the predetermined range. A1 contains Z1 to Z7, and A2 contains Z8 to Z10. Further, A3 contains Z11 to Z16.

The number of remaining sheets of the residual paper P for each remaining range is, for example, the number of remaining sheets obtained by summing the number of remaining sheets of each of the plurality of remaining points included in one remaining range.

Returning to the description of FIG. 3.

In a case where the removal of the residual paper P remaining in the image forming apparatus 10 is completed, the restart control unit 216 as an example of a start section and a control section starts the stopped transport of the paper P by the transport apparatus 100. Further, in a case where the removal of the residual paper P is not completed, the restart control unit 216 does not start the stopped transport of the paper P by the transport apparatus 100.

The restart control unit 216 determines whether or not the removal of the residual paper P remaining in the image forming apparatus 10 is completed based on the input information input by the user and the remaining situation grasped by the residual paper grasping unit 215.

Specifically, the restart control unit 216 determines whether or not the removal of the residual paper P remaining in the image forming apparatus 10 is completed based on the number of removed sheets input by the user. For example, in a case where the number of removed sheets input by the user matches the number of remaining sheets grasped by the residual paper grasping unit 215, the removal of the residual paper P remaining in the image forming apparatus 10 is determined to be completed. On the other hand, in a case where the number of removed sheets does not match the number of remaining sheets, the removal of the residual paper P is determined to be not completed.

Further, in a state where the total number of removed sheets matches the total number of remaining sheets, the restart control unit 216 may determine whether or not the removal of the residual paper P remaining in the image forming apparatus 10 is completed, based on the number of sheets for each point or the number of sheets for each range.

Specifically, in a case where the number of removed sheets for each point where the residual paper P input by the user is removed (hereinafter referred to as "removal point") matches the number of remaining sheets for each remaining point, the removal of the residual paper P remaining in the image forming apparatus 10 is determined to be completed. On the other hand, in a case where the number of removed sheets for each removal point does not match the number of remaining sheets for each remaining point, the removal of the residual paper P is determined to be not completed.

Further, in a case where a predetermined condition is satisfied in a state where the number of removed sheets for each removal point does not match the number of remaining sheets for each remaining point, the restart control unit 216 may start the stopped transport of the paper P by the transport apparatus 100.

For example, an example of a case where the predetermined condition is satisfied includes a case where a total number of removed sheets for each classification of the removal points matches a total number of removed sheets for each classification of the remaining points.

Further, for example, an example of a case where the predetermined condition is satisfied includes a case where the total number of removed sheets matches the total number of remaining sheets and detection is made that the covering member in an area corresponding to the remaining point is opened.

Further, for example, an example of a case where the predetermined condition is satisfied includes a case where the total number of removed sheets matches the total number of remaining sheets and the number of times the user inputs a removal point that does not match the remaining point exceeds a threshold value.

In addition, for example, in a case where the total number of removed sheets is equal to or larger than the total number of remaining sheets, the restart control unit 216 may start the stopped transport of the paper P by the transport apparatus 100. In the above case, in a case where the total number of removed sheets is less than the total number of remaining sheets, the restart control unit 216 does not start the stopped transport of the paper P by the transport apparatus 100.

The communication control unit 217 receives the information related to the print job and the information related to the jam elimination from another apparatus via the communication unit 23.

Further, the communication control unit 217 transmits the information related to the jam elimination to another apparatus via the communication unit 23. Specifically, the communication control unit 217 transmits, to another apparatus, the information used in a case where the restart control unit 216 starts the stopped transport of the paper P, which is the input information input by the user.

Examples of another apparatus include an apparatus that accumulates a plurality of pieces of information about the image forming apparatus 10 and the image forming apparatus 10 of the same model as the image forming apparatus 10.

The jam elimination information DB 218 stores and accumulates the jam elimination information related to the jam elimination. The jam elimination information includes the jam information for specifying the jam and the input information input by the user in a case where the jam is eliminated. The jam elimination information DB 218 manages identification information for identifying the print job in correspondence with each piece of information constituting the jam elimination information.

The input information included in the jam elimination information is input information input by the user in a case where the jam is eliminated. In other words, the input information included in the jam elimination information is information used in a case where the restart control unit 216 starts the stopped transport of the paper P by the transport apparatus 100, which is input information input by the user. The input information included in the jam elimination information includes information indicating the removal point or the number of removed sheets of the residual paper P for each removal point in a case where the jam is eliminated.

Further, the jam elimination information DB 218 may assign priority to each of the remaining points included in the jam information based on the removal point in a case where the jam is eliminated to store and accumulate the information related to the jam elimination.

For example, the priority may be assigned such that a remaining point corresponding to a removal point where the number of removed sheets is larger takes the priority over a remaining point corresponding to a removal point where the number of removed sheets is smaller.

In addition, the jam elimination information DB 218 may assign the priority to each of the remaining points included in the jam information based on the removal point in a case where the jam is eliminated and a predetermined procedure for removing the residual paper P to store and accumulate the information related to the jam elimination.

Hereinafter, a processing example in a case where the image forming apparatus 10 requests an input regarding the number of removed sheets of the residual paper P removed by the user will be described.

Figure 6:
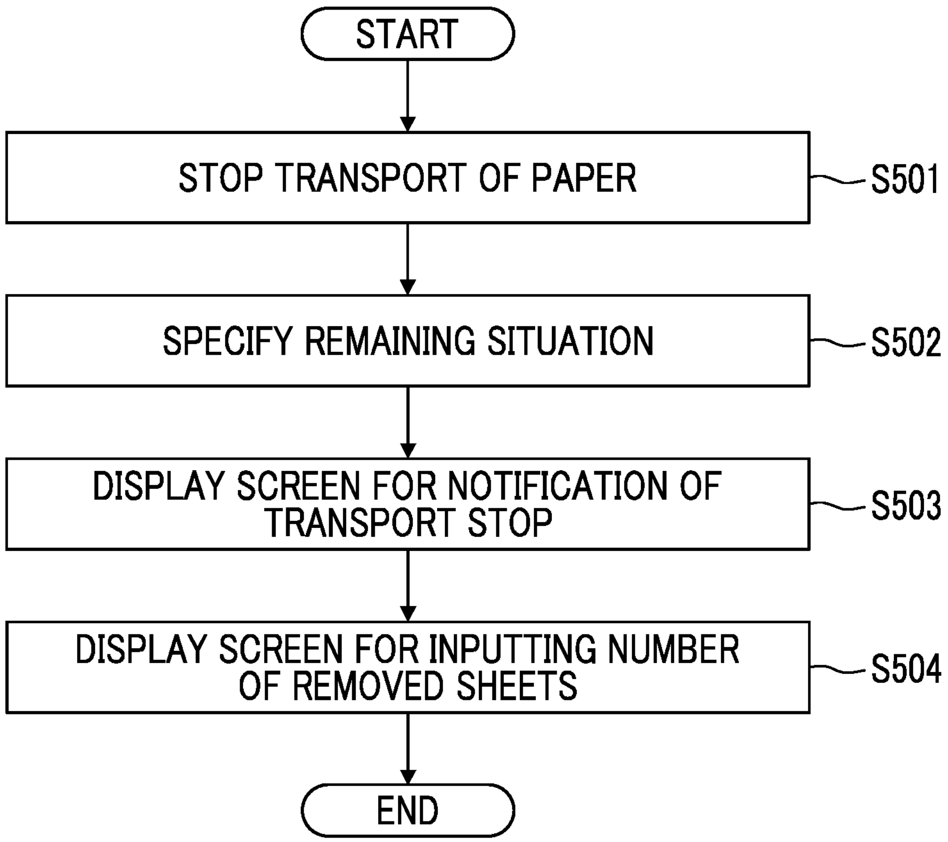
FIG. 6 is a flowchart showing a flow of processing of requesting an input of the number of removed sheets of paper.

FIG. 6 is a flowchart showing a flow of the processing of requesting the input of the number of removed sheets.

First, the transport management unit 214 stops the transport of the paper P by the transport apparatus 100 (S501). Specifically, the transport management unit 214 outputs the stop signal to the transport apparatus 100 based on a timing of detection of the paper P by the paper detection sensor and the transport information.

The residual paper grasping unit 215 specifies the remaining situation (S502). Specifically, the residual paper grasping unit 215 grasps the number of remaining sheets of the residual paper P remaining in the image forming apparatus 10 as well as the remaining point where the residual paper P remains for the specification.

Next, the display control unit 212 causes the display apparatus 30 to display a notification screen of the transport stop (S503). Specifically, the display control unit 212 causes the display apparatus 30 to display a screen that issues notification of the stopping of the transport of the paper P accompanying the execution of the print job, as the notification screen.

Then, the display control unit 212 causes the display apparatus 30 to display an input screen for the number of removed sheets (S504) and ends the processing. Specifically, the display control unit 212 causes the display apparatus 30 to display, as the input screen, a screen that requests the input of the number of removed sheets of the residual paper P removed by the user and ends the processing.

Here, the display in the display apparatus 30 in a case where the jam has occurred in the image forming apparatus 10 will be described.

Figure 7:
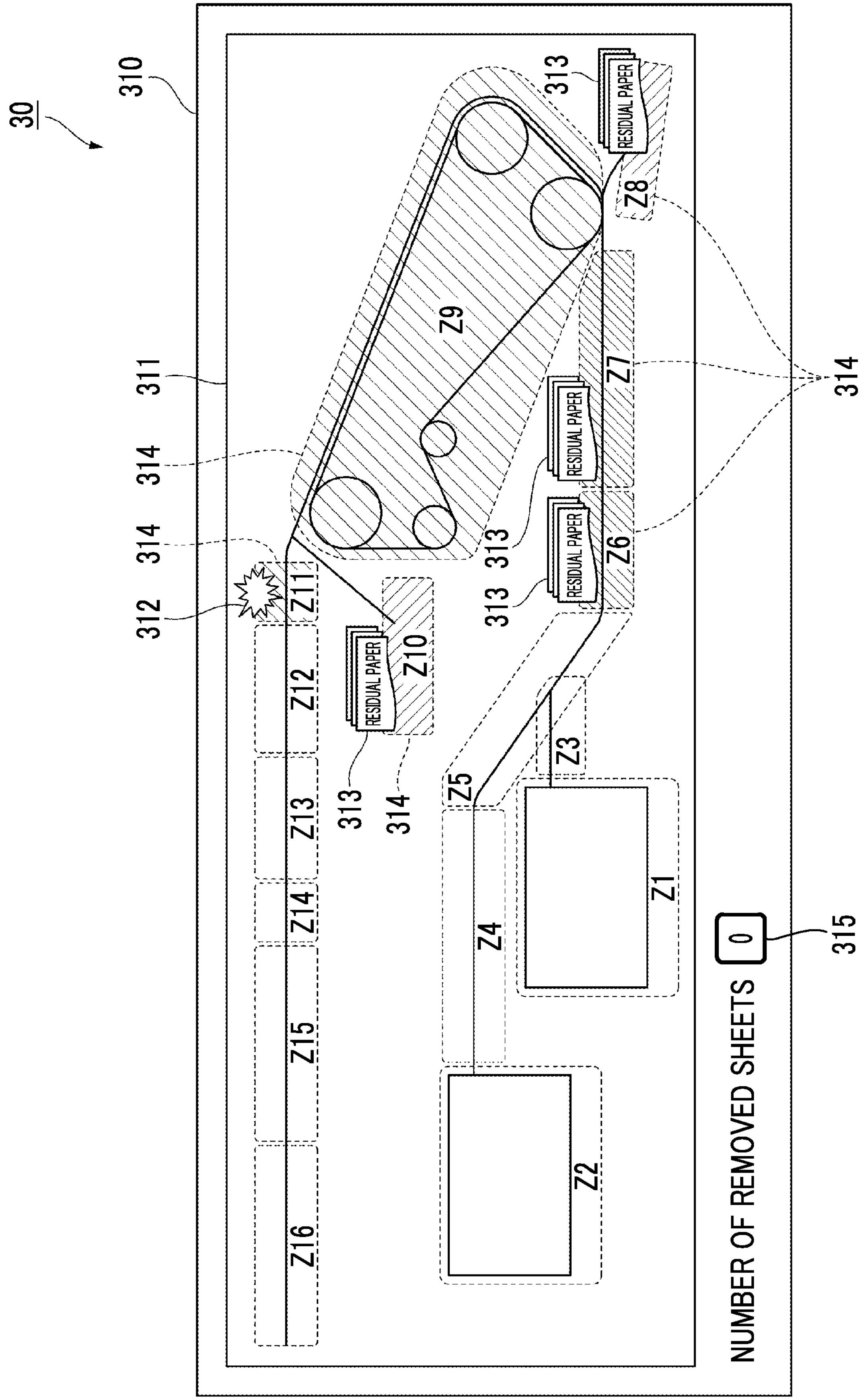
FIG. 7 is a diagram showing another example of the operation screen according to the present exemplary embodiment.

FIG. 7 is a diagram showing another example of the operation screen 310 according to the present exemplary embodiment.

FIG. 7 shows a case where the jam occurs in Z11 and the residual paper P may be in Z6 to Z11, as an example.

In the display example shown in FIG. 7, the operation screen 310 that receives the user operation is displayed on the display apparatus 30 of the image forming apparatus 10 in which the jam has occurred.

The operation screen 310 displays the remaining situation image 311 and the input field 315. A point notification image 312 for issuing notification of the cause point and a residual paper notification image 313 for notification of the remaining of the residual paper P at a point different from the cause point are displayed in the remaining situation image 311.

In the remaining situation image 311, the display modes of Z1 to Z16 are made different between a remaining point where the residual paper P may remain and a point where the residual paper P may not remain. The remaining point is displayed to be distinguished from the point where the residual paper P may not remain, for example, by making a color different or displaying a new frame on an outer edge of a display area.

In the display example shown in FIG. 7, the display areas of Z6 to Z11 corresponding to the remaining points are displayed to be more emphasized than the display areas corresponding to Z1 to Z5 and Z12 to Z16, which are corresponding to the points where the residual paper P may not remain.

The point notification image 312 is an image that causes the user to recognize the cause point. The point notification image 312 is an image that emphasizes the display area corresponding to the cause point such that the cause point is identified from the remaining points. In a case where the removal of the residual paper P at the cause point is completed, the point notification image 312 is hidden.

The residual paper notification image 313 is an image that causes the user to recognize the point where the residual paper P remains. The residual paper notification image 313 is an image that emphasizes a display area corresponding to a specified point such that the point where the remaining of the residual paper P is specified, which is detected by the paper detection sensor or the like, is identified among the remaining points. In a case where the removal of the residual paper P at the specified point is completed, the residual paper notification image 313 is hidden.

Further, the remaining situation image 311 may display a point instruction image 314 that receives an instruction for each remaining point.

Further, the remaining situation image 311 may display the number of remaining sheets of the residual paper P for each remaining point, for example. For example, in a case where the user selects the point instruction image 314, the number of remaining sheets of the residual paper P for each remaining point may be displayed. Further, for example, a badge image such as a small mark in a badge format, which indicates the number of remaining sheets of the residual paper P for each remaining point, may be displayed in association with the remaining point.

Here, a display for causing the user to check the priority will be described.

Figure 8:
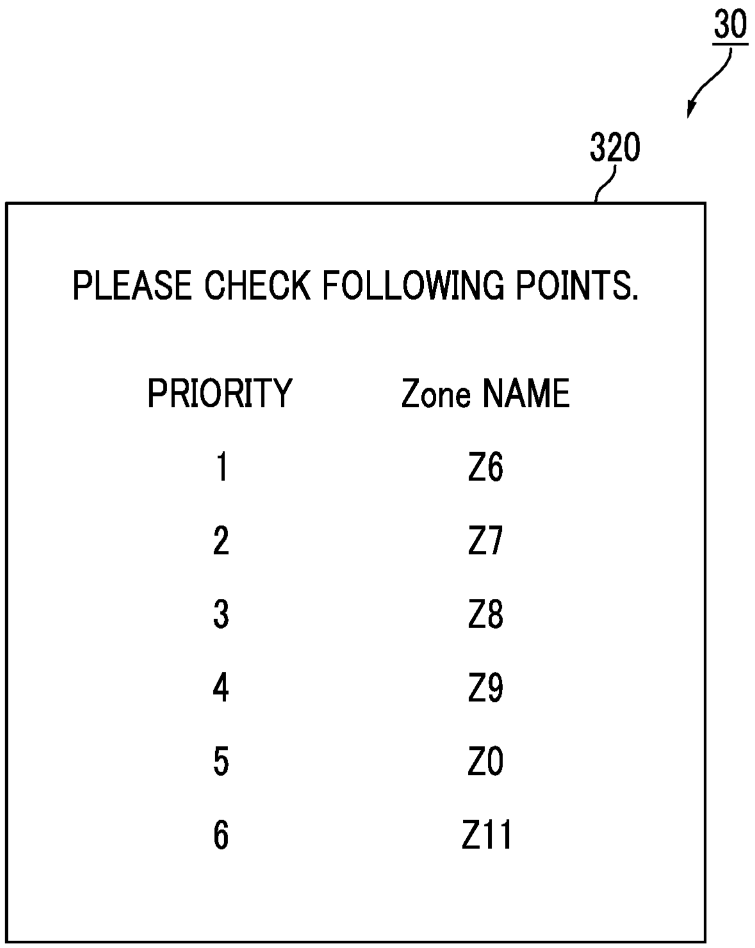
FIG. 8 is a diagram showing an example of display of priority according to the present exemplary embodiment.

FIG. 8 is a diagram showing an example of display of the priority according to the present exemplary embodiment.

FIG. 8 shows a case where the priority is assigned to Z6 to Z11 corresponding to the remaining points shown in FIG. 7, as an example.

In the display example shown in FIG. 8, the display apparatus 30 displays a check screen 320 for causing the user to check a point to be checked as a point where the residual paper P is removed and a priority assigned to the point to be checked.

The check screen 320 displays, for example, Z6 to Z11 corresponding to the remaining points as the point to be checked as the point where the residual paper P is removed. Further, the check screen 320 displays the priority assigned to each of Z6 to Z11 in association with each of Z6 to Z11.

The check screen 320 may be displayed together with the remaining situation image 311 on the operation screen 310 shown in FIG. 7.

The display for causing the user to check the priority is not limited to the check screen 320. As the display for causing the user to check the priority, for example, an image for issuing notification of the priority assigned to each of Z1 to Z16 may be displayed on the remaining situation image 311 in association with each area of Z1 to Z16. An example of the image for issuing the notification of the priority includes the badge image for notifying the user with a small mark in a badge format.

The input screen in the present exemplary embodiment is not limited to the configuration in which the input of the total number of removed sheets of the residual paper P removed from the transport path by the user in the image forming apparatus 10 is received, as shown in FIG. 7. Hereinafter, another example of the input screen will be described.

Figure 9:
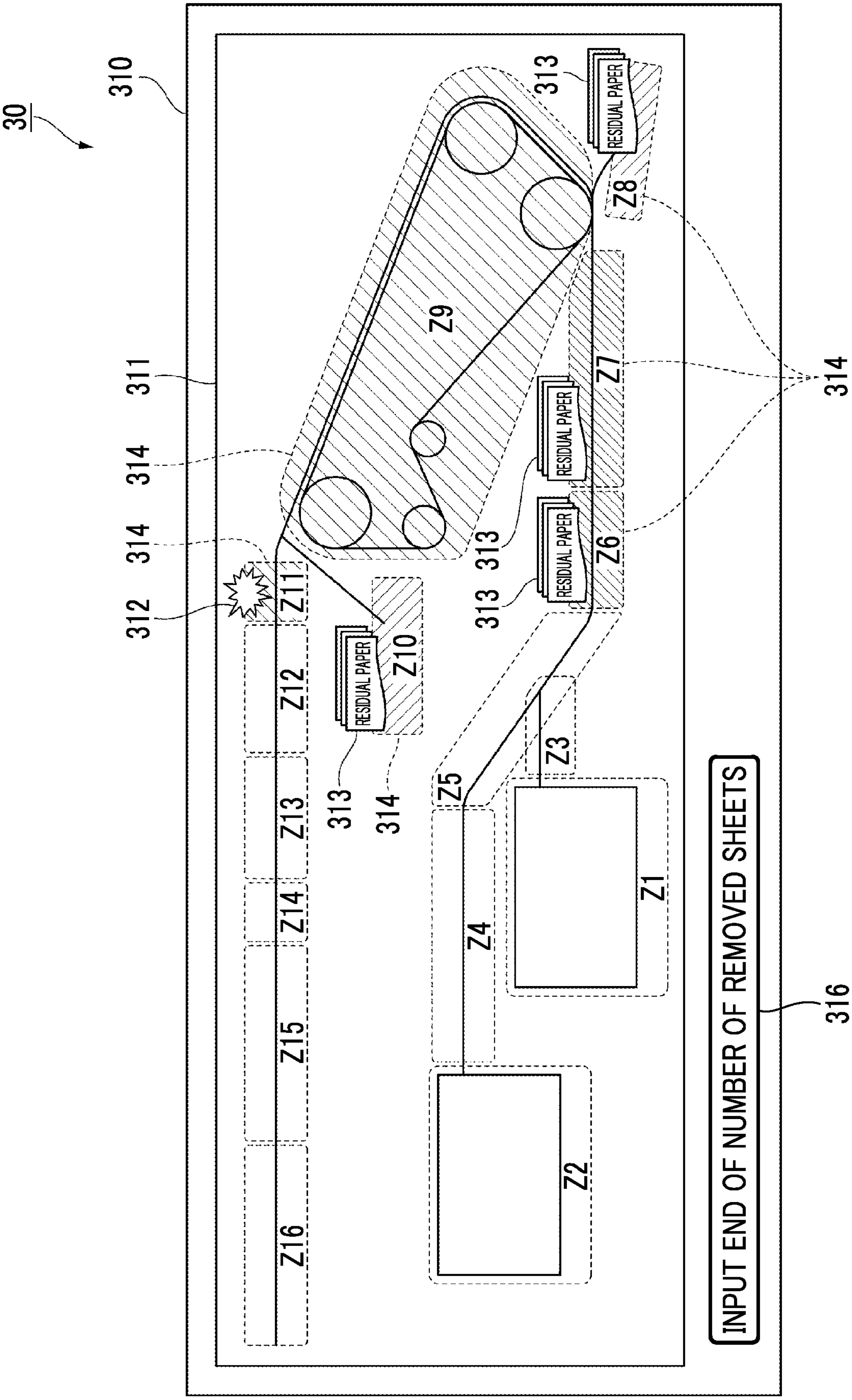
FIG. 9 is a diagram showing another example of the operation screen according to the present exemplary embodiment.

FIG. 9 is a diagram showing another example of the operation screen 310 according to the present exemplary embodiment.

Figure 10:
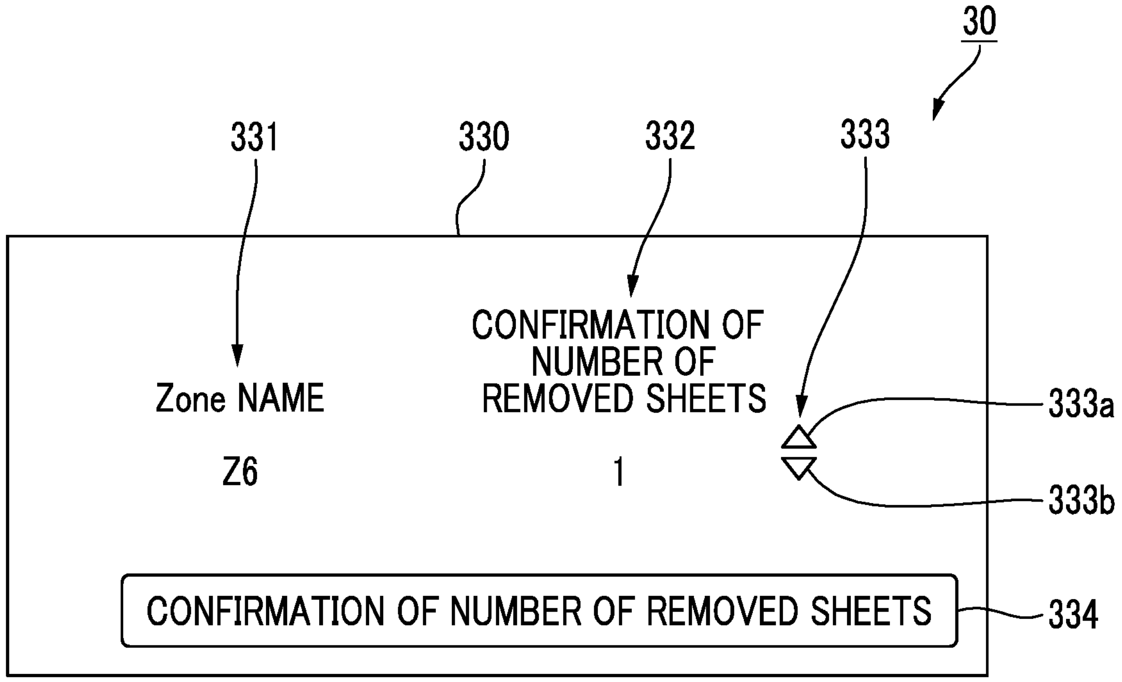
FIG. 10 is a diagram showing another example of the input screen according to the present exemplary embodiment.

FIG. 10 is a diagram showing another example of the input screen 330 according to the present exemplary embodiment.

Figure 11:
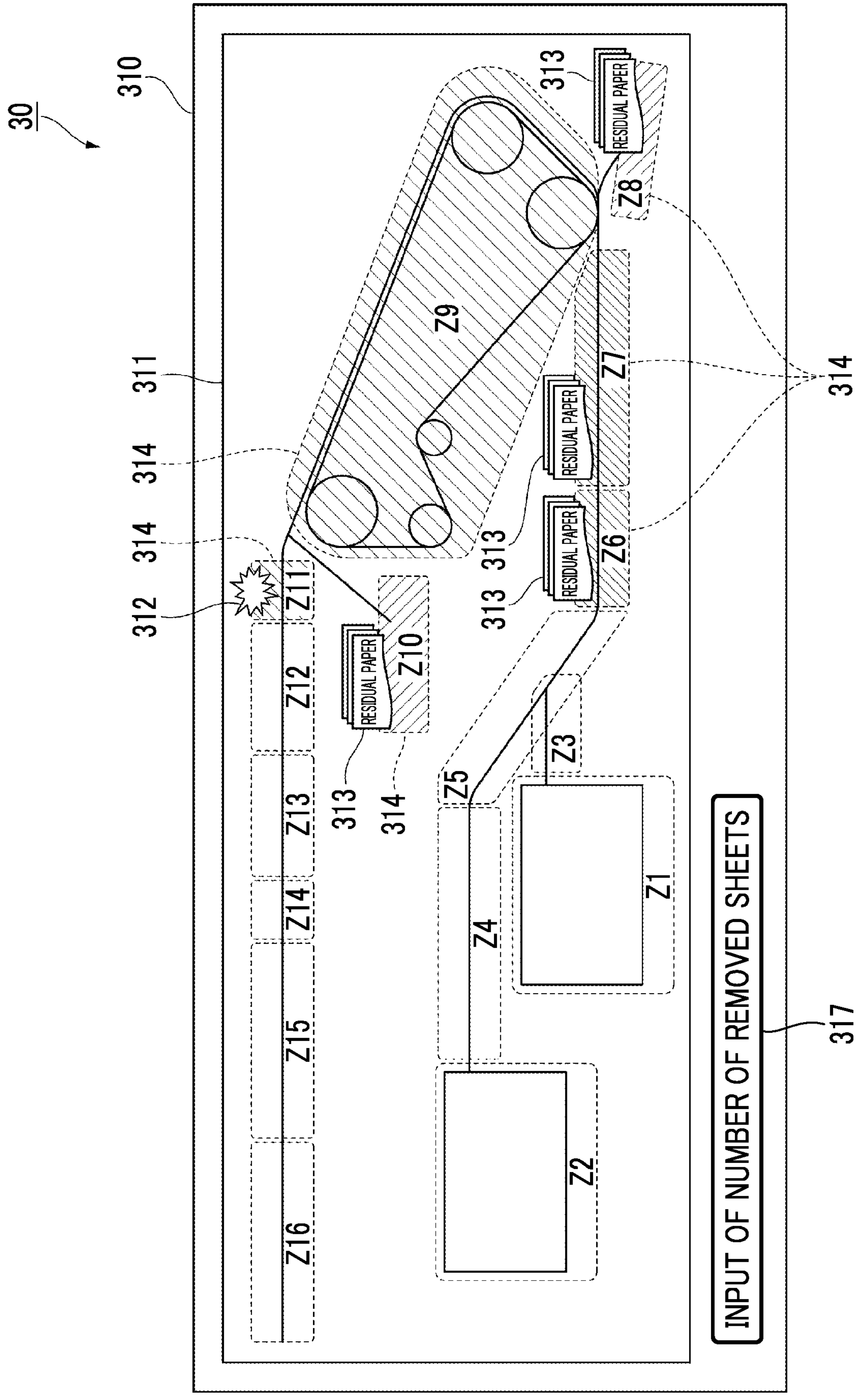
FIG. 11 is a diagram showing another example of the operation screen according to the present exemplary embodiment.
Figure 12:
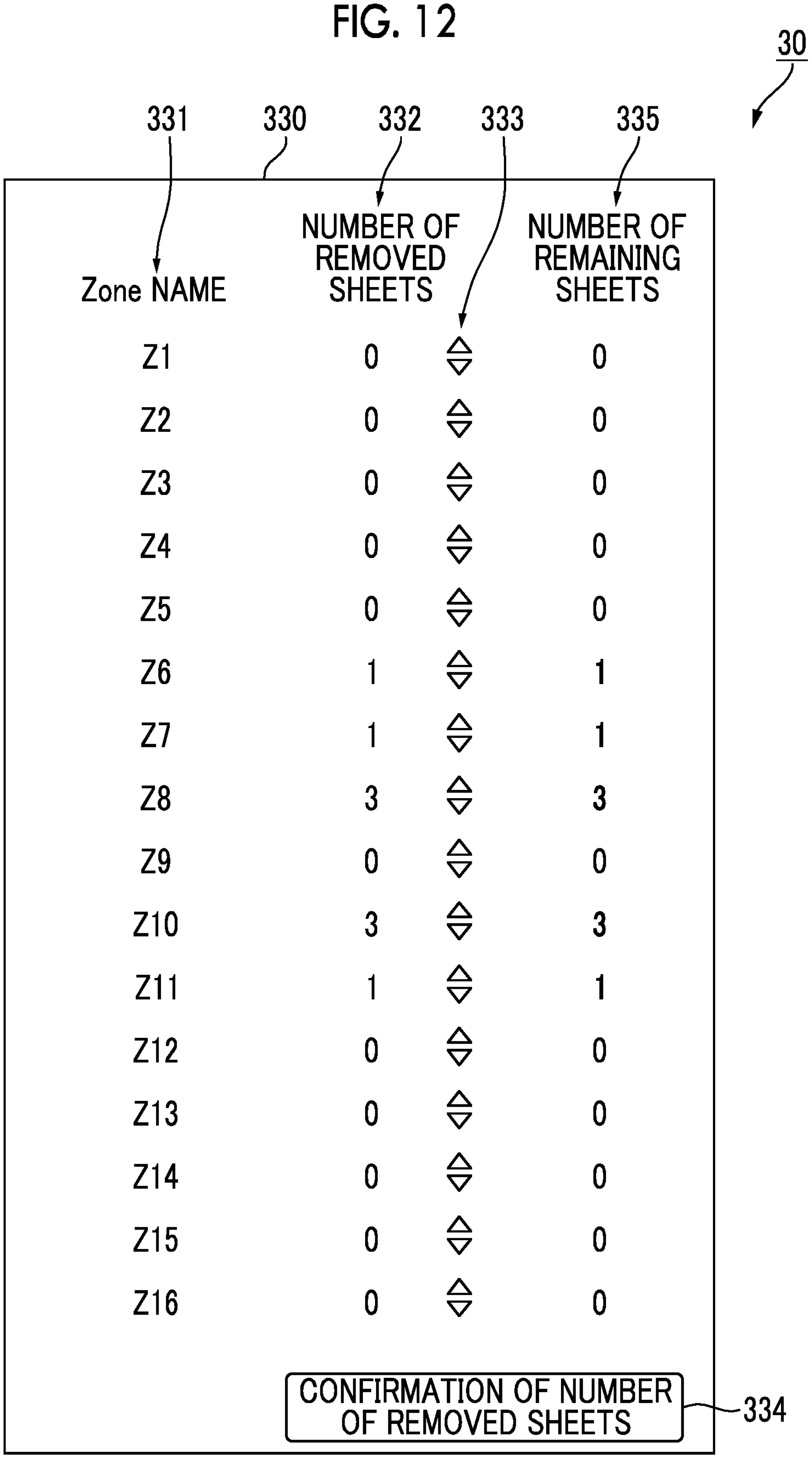
FIG. 12 is a diagram showing another example of the input screen according to the present exemplary embodiment.

FIGS. 11 and 12 show a case where the input of the number of removed sheets for each of Z6 to Z11 corresponding to the remaining points, for the residual paper P removed from the transport path by the user in the image forming apparatus 10, is received, as an example.

In the display example shown in FIG. 9, the operation screen 310 displays the remaining situation image 311 and an input end image 316.

The input end image 316 is an image that receives the end of the input related to the number of removed sheets of the residual paper P. Specifically, the input end image 316 is an image that receives an instruction to end the input of the number of removed sheets of the residual paper P and to restart the stopped transport of the paper P according to the input information.

In the above display example, the point instruction image 314 included in the remaining situation image 311 receives an instruction to input the number of removed sheets of the residual paper P removed by the user for each remaining point.

In the present exemplary embodiment, in a case where the user selects the point instruction image 314 corresponding to Z6, the input screen 330 that receives the input of the number of removed sheets of the residual paper P removed by the user from the pre-registration unit 106 corresponding to Z6 is displayed, as shown in FIG. 10.

In the display example of FIG. 10, the input screen 330 displays a target point field 331 indicating a target point where the number of removed sheets is input and an input sheet number field 332 displaying the number of removed sheets input by the user.

In the above display example, the input screen 330 displays a sheet number change field 333 that receives a change in number displayed in the input sheet number field 332.

The sheet number change field 333 displays, for example, an addition button 333*a* that receives addition of 1 to the number displayed in the input sheet number field 332 and a subtraction button 333*b* that receives subtraction of 1 from the number displayed in the input sheet number field 332.

Further, in the above display example, the input screen 330 displays a sheet number confirmation image 334 that receives an instruction to check the input of the number of removed sheets of the residual paper P removed by the user from the point displayed in the target point field 331.

In the present exemplary embodiment, in a case where the user selects the sheet number confirmation image 334, the display of the input screen 330 is canceled. In other words, in the present exemplary embodiment, in a case where the user selects the sheet number confirmation image 334, the input screen 330 is hidden.

Specifically, in a case where the user selects the sheet number confirmation image 334, the display on the display apparatus 30 returns to the display shown in FIG. 9.

Further, the input screen 330 is not limited to the configuration of being displayed for each remaining point and may collectively receive the input of the number of removed sheets for each of a plurality of removal points.

FIG. 11 is a diagram showing another example of the operation screen 310 according to the present exemplary embodiment.

FIG. 12 is a diagram showing another example of the input screen 330 according to the present exemplary embodiment.

In the display example shown in FIG. 11, the operation screen 310 displays the remaining situation image 311 and a display instruction image 317.

The display instruction image 317 is an image that receives an instruction to display the input screen 330 that collectively receives the input of the number of removed sheets for each of the plurality of removal points.

In the present exemplary embodiment, in a case where the user selects the display instruction image 317, the input screen 330 that collectively receives the input of the number of removed sheets for each of the plurality of removal points is displayed, as shown in FIG. 12.

In the display example of FIG. 12, the input screen 330 displays the target point field 331 indicating a plurality of target points, and displays the input sheet number field 332 and the sheet number change field 333 to correspond to each of the plurality of target points.

In the above display example, the input screen 330 displays a remaining sheet number field 335 indicating the number of remaining sheets of the residual paper P for each remaining point specified by the residual paper grasping unit 215.

In the present exemplary embodiment, in a case where the user selects the sheet number confirmation image 334, processing of restarting the stopped transport of the paper P according to the input information is executed.

Further, the input screen 330 is not limited to the configuration in which the input of the number of removed sheets for each removal point is received, and may receive the input of the number of remaining sheets for each remaining range.

Figure 13:
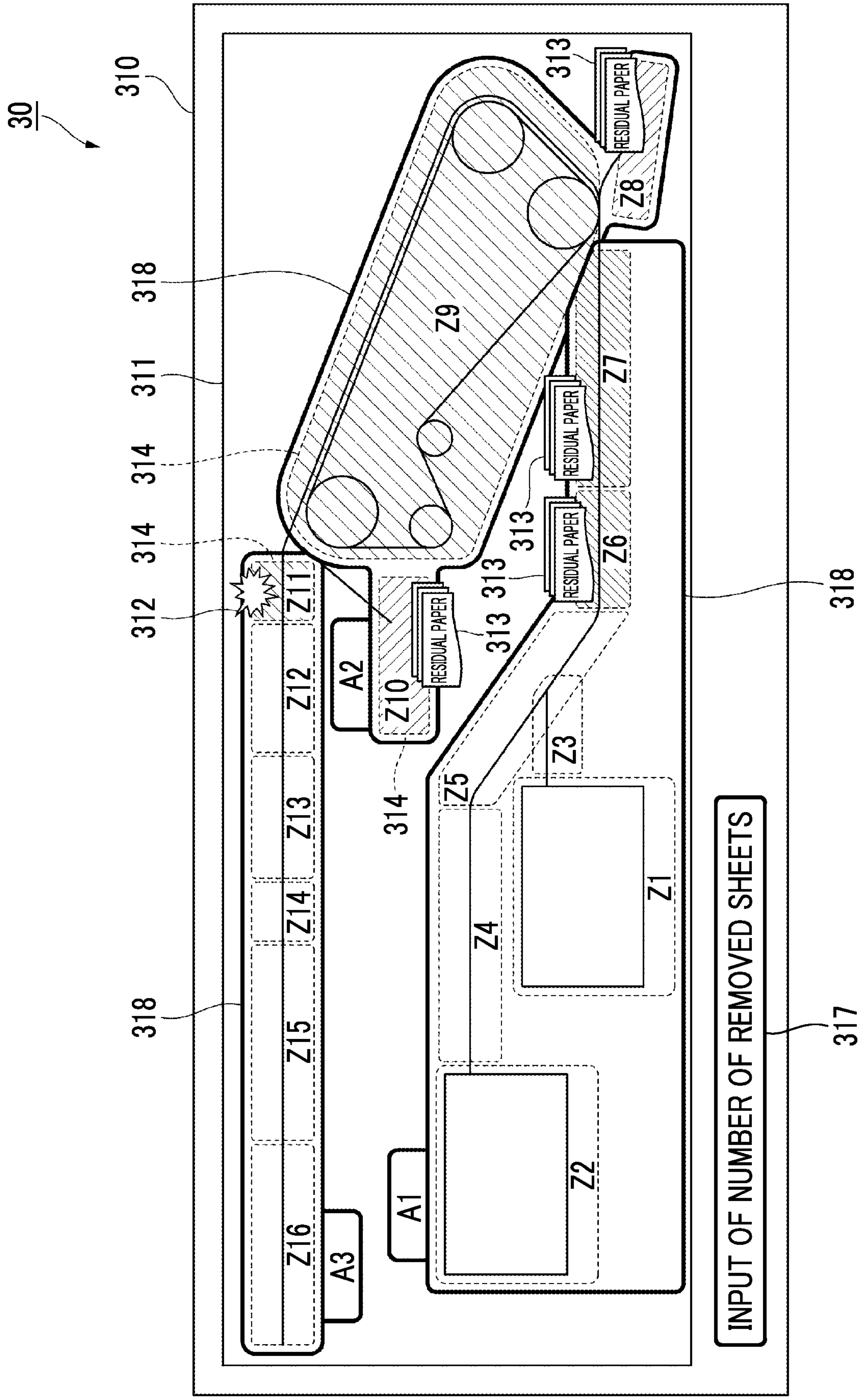
FIG. 13 is a diagram showing another example of the operation screen according to the present exemplary embodiment.

FIG. 13 is a diagram showing another example of the operation screen 310 according to the present exemplary embodiment.

Figure 14:
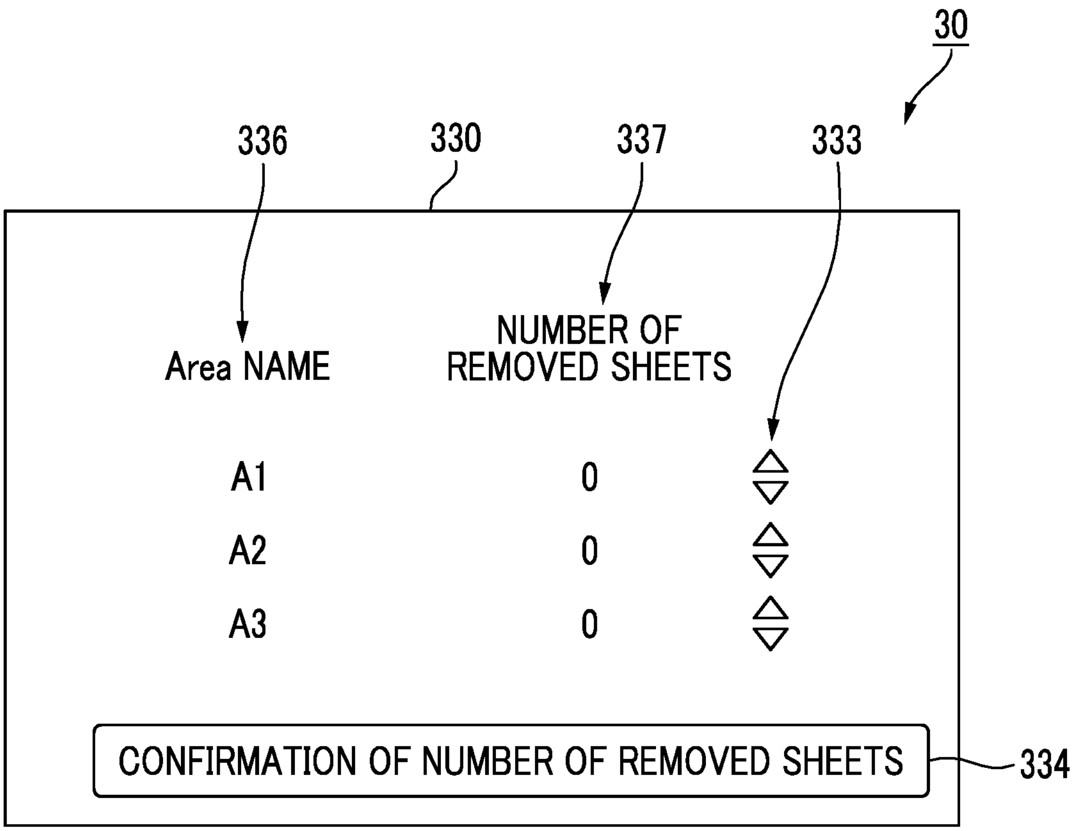
FIG. 14 is a diagram showing another example of the input screen according to the present exemplary embodiment.

FIG. 14 is a diagram showing another example of the input screen 330 according to the present exemplary embodiment.

In the display example shown in FIG. 13, the operation screen 310 displays the remaining situation image 311 including a range instruction image 318 and the display instruction image 317.

In the above display example, the remaining situation image 311 is a schematic diagram of the inside of the image forming apparatus 10 in which the transport path of the paper P is divided into ranges indicated by A1, A2, and A3. Specifically, the remaining situation image 311 is a schematic diagram in which each point in the transport path of the paper P is classified with Z1 to Z7 as A1, Z8 to Z10 as A2, and Z11 to Z16 as A3.

The remaining situation image 311 displays that each of Z1 to Z16 is classified into A1, A2, and A3, and the display modes of Z1 to Z16 are made different between the remaining point where the residual paper P may remain and the point where the residual paper P may not remain. Accordingly, the user who removes the residual paper P refers to not only the remaining range of the residual paper P but also the remaining point.

The range instruction image 318 is an image that receives an instruction for each remaining range. In a case where the user selects the range instruction image 318, for example, the number of remaining sheets of the residual paper P for each remaining range or the number of remaining sheets of the residual paper P for each remaining point included in the remaining range may be displayed.

The display instruction image 317 is an image that receives an instruction to display the input screen 330 that collectively receives the input of the number of removed sheets for each of a plurality of removal ranges.

In the present exemplary embodiment, in a case where the user selects the display instruction image 317, the input screen 330 that collectively receives the input of the number of removed sheets for each of the plurality of removal ranges is displayed, as shown in FIG. 14.

In the display example of FIG. 14, the input screen 330 displays a target range field 336 indicating a plurality of target ranges, an input sheet number field 337 displaying the number of removed sheets for each removal range input by the user, the sheet number change field 333, and the sheet number confirmation image 334.

Further, the input screen 330 may display the number of remaining sheets of the residual paper P for each remaining range specified by the residual paper grasping unit 215.

In the present exemplary embodiment, in a case where the user selects the sheet number confirmation image 334, the processing of restarting the stopped transport of the paper P according to the input information is executed.

Further, the present invention is not limited to the input screen 330 that collectively receives the input of the number of removed sheets for each of the plurality of removal ranges, and the input screen 330 that receives the input of the number of removed sheets for each removal range may be displayed.

For example, the range instruction image 318 included in the remaining situation image 311 may receive an instruction to input the number of removed sheets of the residual paper P removed by the user for each remaining range. In the above case, the operation screen 310 also displays the input end image 316 (refer to FIG. 9) that receives the instruction to end the input of the number of removed sheets of the residual paper P and to restart the stopped transport of the paper P according to the input information.

In a case where the user selects the range instruction image 318, the input screen 330 that receives the input of the number of removed sheets of the residual paper P removed by the user from the range corresponding to the range instruction image 318 selected by the user is displayed. Further, in a case where the user selects the sheet number confirmation image 334 (refer to FIG. 10), the input screen 330 is hidden.

Next, a processing example in a case where the image forming apparatus 10 restarts the stopped transport of the paper P according to the input information will be described with reference to FIG. 15.

Figure 15:
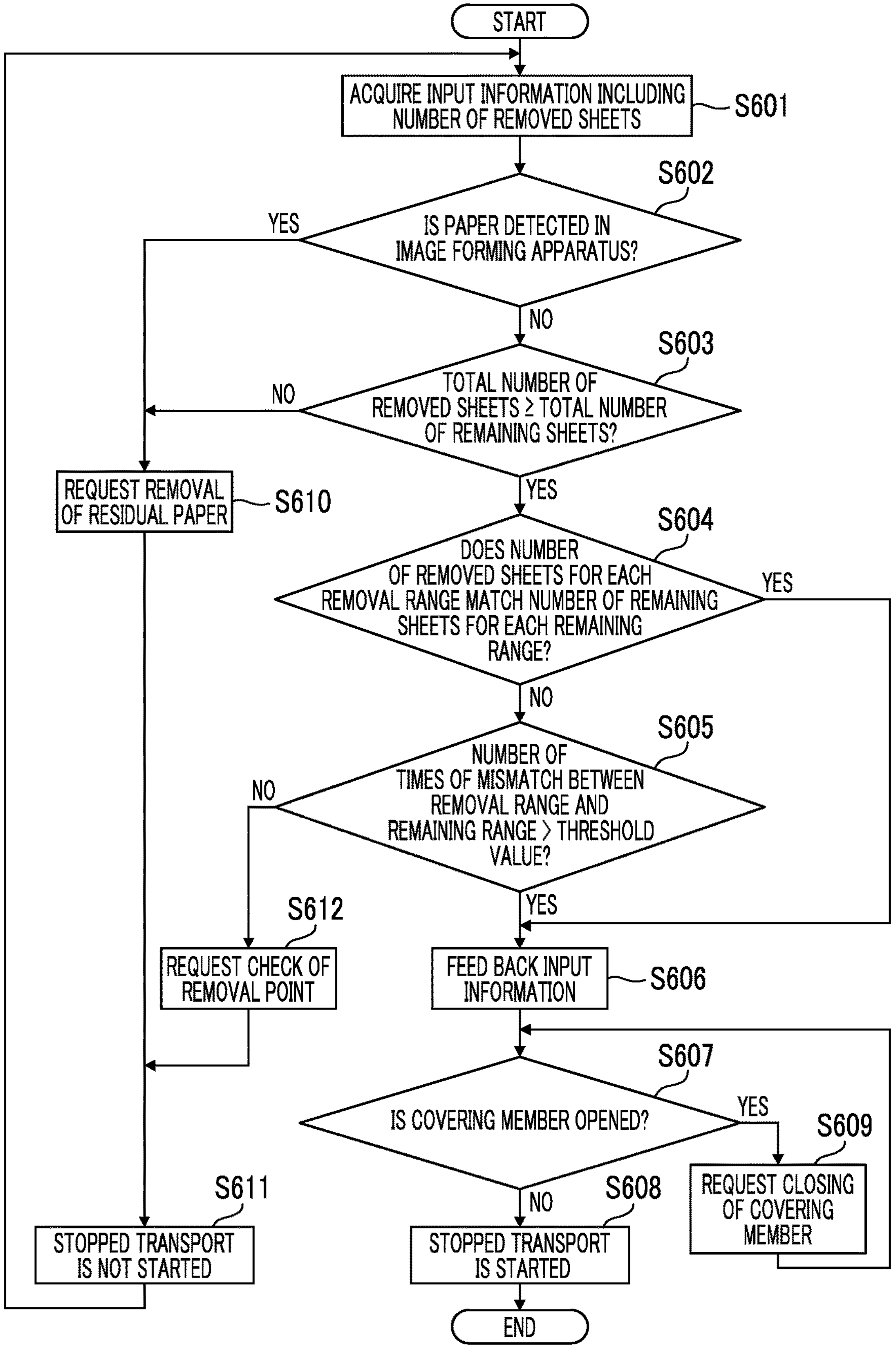
FIG. 15 is a flowchart showing a flow of processing of restarting transport of stopped paper.

FIG. 15 is a flowchart showing a flow of the processing of restarting the stopped transport of the paper P.

Here, a case is taken as an example in which the image forming apparatus 10 grasps the number of remaining sheets for each remaining point and the user inputs the number of removed sheets for each removal point.

First, the operation reception unit 213 acquires the input information including the number of removed sheets of the residual paper P removed from the transport path by the user (S601). Specifically, the operation reception unit 213 receives, from the user, the input of the number of removed sheets for each removal point via the display apparatus 30, for the residual paper P removed from the transport path by the user, to acquire the input information.

The residual paper grasping unit 215 specifies whether or not the paper P is detected in the image forming apparatus 10 (S602). Specifically, the residual paper grasping unit 215 specifies whether or not the residual paper P is detected from the information acquired from the paper detection sensor.

In a case where the paper P is not detected in the image forming apparatus 10 (NO in S602), the restart control unit 216 determines whether or not the total number of removed sheets is equal to or larger than the total number of remaining sheets (S603). Specifically, the restart control unit 216 determines whether or not the total number of removed sheets input by the user is equal to or larger than the total number of remaining sheets specified by the residual paper grasping unit 215 in a case where the jam has occurred in the image forming apparatus 10.

Here, a comparison between the total number of removed sheets and the total number of remaining sheets will be described.

FIG. 16 is a table showing an example of the input information and the prediction information.

FIG. 16 shows a case where the information indicating the number of removed sheets for each of Z1 to Z16 (refer to FIG. 9) is acquired as the input information.

In the example shown in FIG. 16, as the input information, information indicating the number of removed sheets of the residual paper P for each removal point is acquired, such as one sheet for "Zone name" Z5, Z7, Z9, and Z12, two sheets for Z10, and three sheets for Z8. Further, as the prediction information, information indicating the number of remaining sheets of the residual paper P for each remaining point is acquired, such as one sheet for the "Zone name" Z6, Z7, and Z11 and three sheets for the "Zone name" Z8 and Z10.

In the above case, the number of sheets removed for each removal point of the residual paper P removed by the user does not match the number of remaining sheets for each remaining point predicted by the residual paper grasping unit 215. However, the total number of removed sheets is nine sheets and matches the total number of remaining sheets of nine sheets.

In a case where the total number of removed sheets is equal to or larger than the total number of remaining sheets (YES in S603), the restart control unit 216 determines whether or not the number of removed sheets for each removal range matches the number of remaining sheets for each remaining range (S604). Specifically, the restart control unit 216 totals the number of removed sheets input for each remaining point for each remaining range to determine whether or not all the number of remaining sheets for each remaining range specified by the residual paper grasping unit 215 in a case where the jam has occurred match.

For example, in a case where the information shown in FIG. 16 is acquired, the number of removed sheets matches the number of remaining sheets in all of the ranges indicated by A1 to A3.

FIG. 17 is a table showing another example of the input information and the prediction information.

In the example shown in FIG. 17, as the input information, the information indicating the number of removed sheets of the residual paper P for each removal point is acquired, such as one sheet for "Zone name" Z9, Z10, and Z12 and two sheets for "Zone name" Z6 to Z8. Further, information obtained by totaling, for each range, the number of removed sheets for each removal point is also acquired, such as four sheets for "Area name" A1, four sheets for "Area name" A2, and one sheet for "Area name" A3.

In the above case, the total number of removed sheets of the residual paper P removed by the user is nine sheets and matches the total number of remaining sheets of nine sheets predicted by the residual paper grasping unit 215. On the other hand, the number of removed sheets of "Area name" A3 is one and matches the number of remaining sheets, while the number of removed sheets of "Area name" A1 and A2 is four and does not match the number of remaining sheets.

Returning to the description of FIG. 15.

In a case where the number of removed sheets for each removal range does not match the number of remaining sheets for each remaining range (NO in S604), the restart control unit 216 determines whether or not the number of times of mismatch between the removal range and the remaining range exceeds a threshold value (S605). Specifically, in a case where the information as shown in FIG. 17 is acquired, the restart control unit 216 determines whether or not the number of times the user inputs the number of removed sheets for each removal range that does not completely match the number of remaining sheets for each remaining range exceeds the threshold value for one jam.

In a case where the number of times of mismatch between the removal range and the remaining range exceeds the threshold value (YES in S605), the jam elimination information DB 218 feeds back the input information, which will be described in detail below (S606).

Further, in a case where the number of removed sheets for each removal range matches the number of remaining sheets for each remaining range in S604 (YES in S604), the processing proceeds to S606, and the jam elimination information DB 218 feeds back the input information.

Next, the restart control unit 216 determines whether or not the covering member is opened (S607). For example, the restart control unit 216 determines whether or not the covering member is opened, based on the information acquired from the opening and closing detection sensor that detects opening and closing of the covering member.

In a case where the covering member is not opened (NO in S607), the restart control unit 216 starts the stopped transport (S608) and ends the processing. Specifically, the restart control unit 216 determines that the removal of the residual paper P remaining in the image forming apparatus 10 is completed, starts the stopped transport of the paper P by the transport apparatus 100, and ends the processing.

In a case where the covering member is opened in S607 (YES in S607), the restart control unit 216 requests the closing of the covering member (S609) and repeats the processing of S607 until the covering member is closed. Specifically, the restart control unit 216 displays, for example, the request of closing the covering member on the display apparatus 30 until all of the covering members are closed. In addition, the closing of the covering member may be requested by using sound, light, or the like.

In a case where the paper P is detected in the image forming apparatus 10 in S602 (YES in S602), the restart control unit 216 requests the removal of the residual paper P (S610). Specifically, the restart control unit 216 displays, for example, the request of removing the residual paper P on the display apparatus 30 until the paper P is no longer detected in the image forming apparatus 10. In addition, the removal of the residual paper P may be requested by using sound, light, or the like.

The restart control unit 216 repeats the processing of S601 without starting the stopped transport (S611). Specifically, the restart control unit 216 does not start the stopped transport of the paper P by the transport apparatus 100 until the removal of the residual paper P remaining in the image forming apparatus 10 is determined to be completed.

In a case where the total number of removed sheets is less than the total number of remaining sheets in S603 (NO in S603), the restart control unit 216 requests the removal of the residual paper P (S610) and does not start the stopped transport (S611).

Further, in a case where the number of times of mismatch between the removal range and the remaining range does not exceed the threshold value in S605 (NO in S605), the restart control unit 216 requests the check of the removal point (S612) and does not start the stopped transport (S611). Specifically, the restart control unit 216 displays, on the display apparatus 30, notification of mismatch between the removal point input by the user and the remaining point specified by the residual paper grasping unit 215. In addition, the check of the removal point may be requested by using sound, light, or the like.

Next, a processing example in a case where the image forming apparatus 10 specifies the number of remaining sheets of the residual paper P remaining in the image forming apparatus 10 will be described with reference to FIG. 18.

Figure 18:
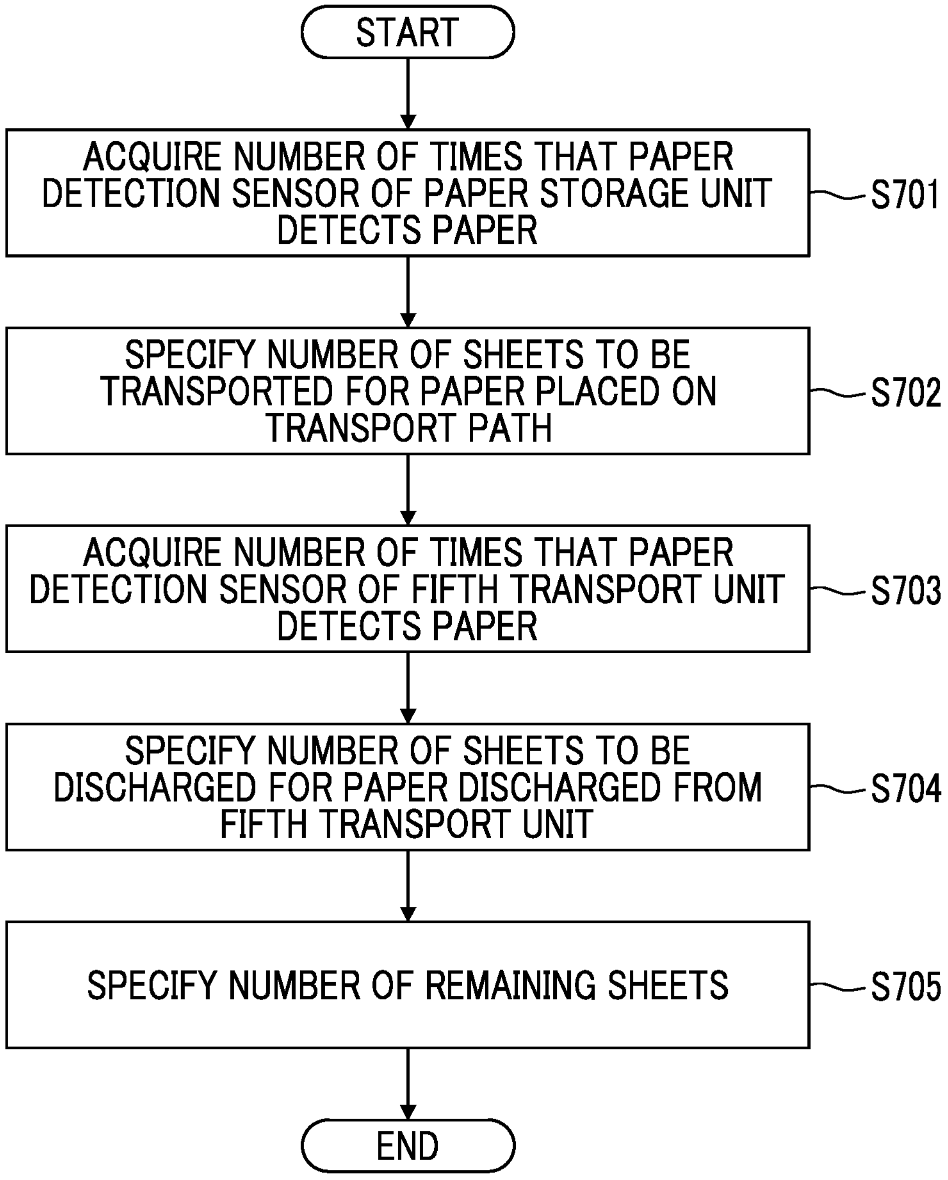
FIG. 18 is a flowchart showing a flow of processing of specifying the number of remaining sheets.

FIG. 18 is a flowchart showing a flow of processing of specifying the number of remaining sheets.

Here, a case of specifying the total number of remaining sheets of the residual paper P remaining in the image forming apparatus 10 is taken as an example.

First, the residual paper grasping unit 215 acquires the number of times that the paper detection sensors of the first paper storage unit 101 and the second paper storage unit 102 detect the paper P (S701).

Based on the number of times that the paper detection sensors of the first paper storage unit 101 and the second paper storage unit 102 detect the paper P, the residual paper grasping unit 215 specifies the number of sheets of the paper P placed on the transport path (hereinafter referred to as "number of sheets to be transported") (S702).

Next, the residual paper grasping unit 215 acquires the number of times that the paper detection sensor of the fifth transport unit 116 detects the paper P (S703).

Based on the number of times that the paper detection sensor of the fifth transport unit 116 detects the paper P, the residual paper grasping unit 215 specifies the number of sheets of the paper P discharged from the fifth transport unit 116 (hereinafter referred to as "number of sheets to be discharged") (S704).

The residual paper grasping unit 215 specifies the number of remaining sheets based on the number of sheets to be transported and the number of sheets to be discharged (S705) and ends the processing.

Specifically, the residual paper grasping unit 215 specifies the number of sheets obtained by subtracting the number of sheets to be transported from the number of sheets to be discharged as the total number of remaining sheets of the residual paper P remaining in the image forming apparatus 10.

Next, a processing example in a case where the image forming apparatus 10 specifies the remaining point of the residual paper P remaining in the image forming apparatus 10 will be described with reference to FIG. 19.

Figure 19:
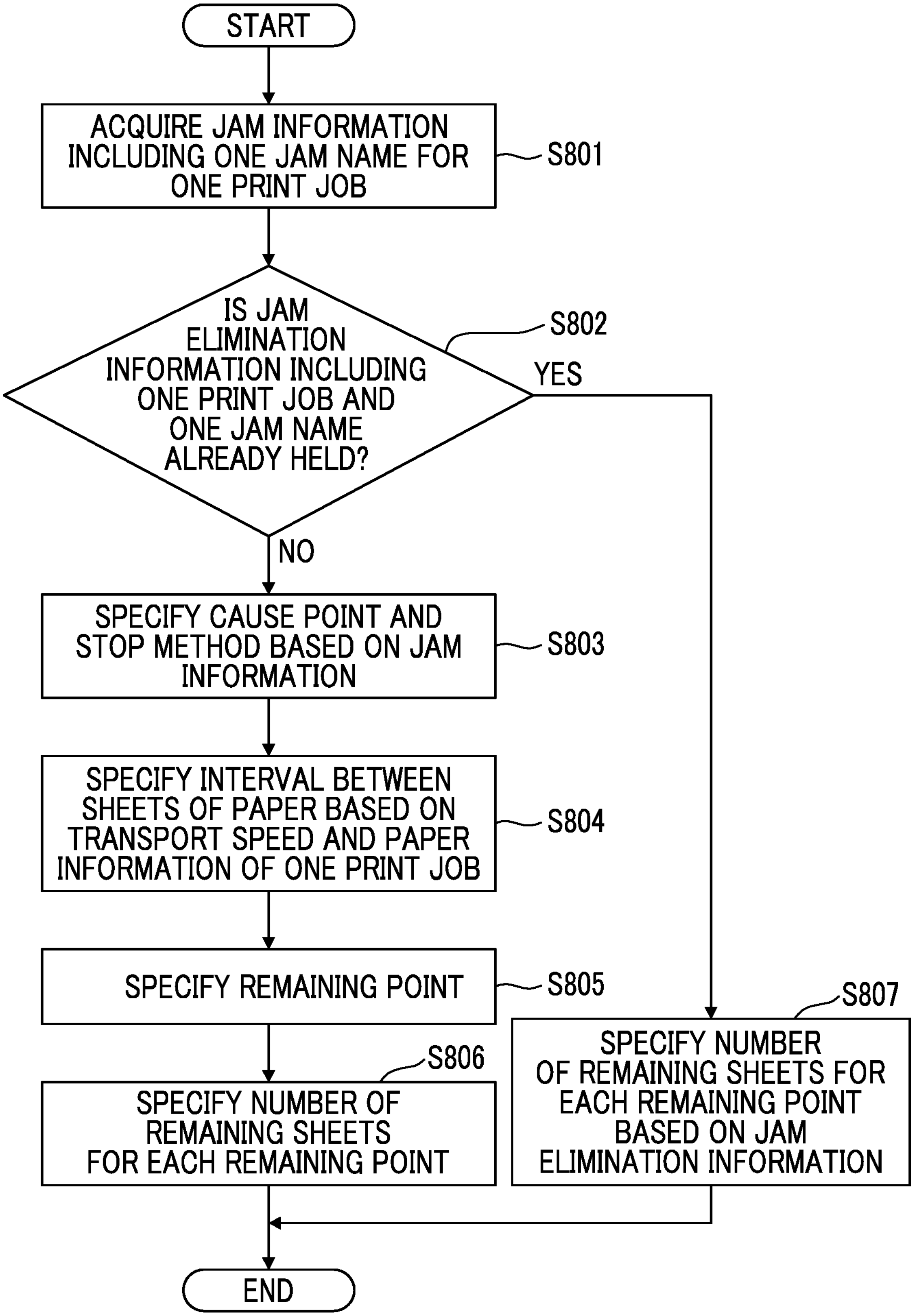
FIG. 19 is a flowchart showing a flow of processing of specifying a remaining point.

FIG. 19 is a flowchart showing a flow of processing of specifying the remaining point. First, the residual paper grasping unit 215 acquires the jam information including one jam name for one print job (S801). Specifically, the residual paper grasping unit 215 acquires jam information for specifying one jam that has occurred during the execution of one print job.

The residual paper grasping unit 215 determines whether or not the jam elimination information including one print job and one jam name is already held (S802).

Specifically, the residual paper grasping unit 215 inquires of the jam elimination information DB 218 whether or not the jam elimination information held in a case where one jam that has occurred during the execution of one print job in the past is eliminated is stored. In a case where the jam elimination information in which the identification information indicating one print job is associated with the jam information including one jam name is stored, the jam elimination information including one print job and one jam name is determined to be already held.

In a case where the jam elimination information including one print job and one jam name is not held (NO in S802), the residual paper grasping unit 215 specifies the cause point and the stop method based on the acquired jam information (S803).

The residual paper grasping unit 215 specifies an interval between sheets of paper based on the transport speed and paper information of one print job (S804). Further, the residual paper grasping unit 215 may specify the interval between sheets of paper based on the information generated by the transport management unit 214 in a case where one print job is executed.

Next, the residual paper grasping unit 215 specifies the remaining point of the residual paper P based on the cause point, the stop method, and the interval between sheets of paper (S805).

The residual paper grasping unit 215 specifies the number of remaining sheets for each specified remaining point (S806) and ends the processing. Specifically, the residual paper grasping unit 215 specifies the number of remaining sheets for each remaining point based on the number of times that the paper detection sensor provided at the specified remaining point detects the paper P, and ends the processing.

In a case where the jam elimination information including one print job and one jam name is already held in S802 (YES in S802), the residual paper grasping unit 215 specifies the number of remaining sheets for each remaining point based on the jam elimination information (S807) and ends the processing. Specifically, based on a point where the user removes the residual paper P among the input information used in a case where one jam that has occurred in the past is eliminated in one print job, the residual paper grasping unit 215 specifies the remaining point and the number of remaining sheets for each remaining point.

Next, a processing example in a case where the image forming apparatus 10 feeds back the input information input by the user will be described with reference to FIG. 20.

Figure 20:
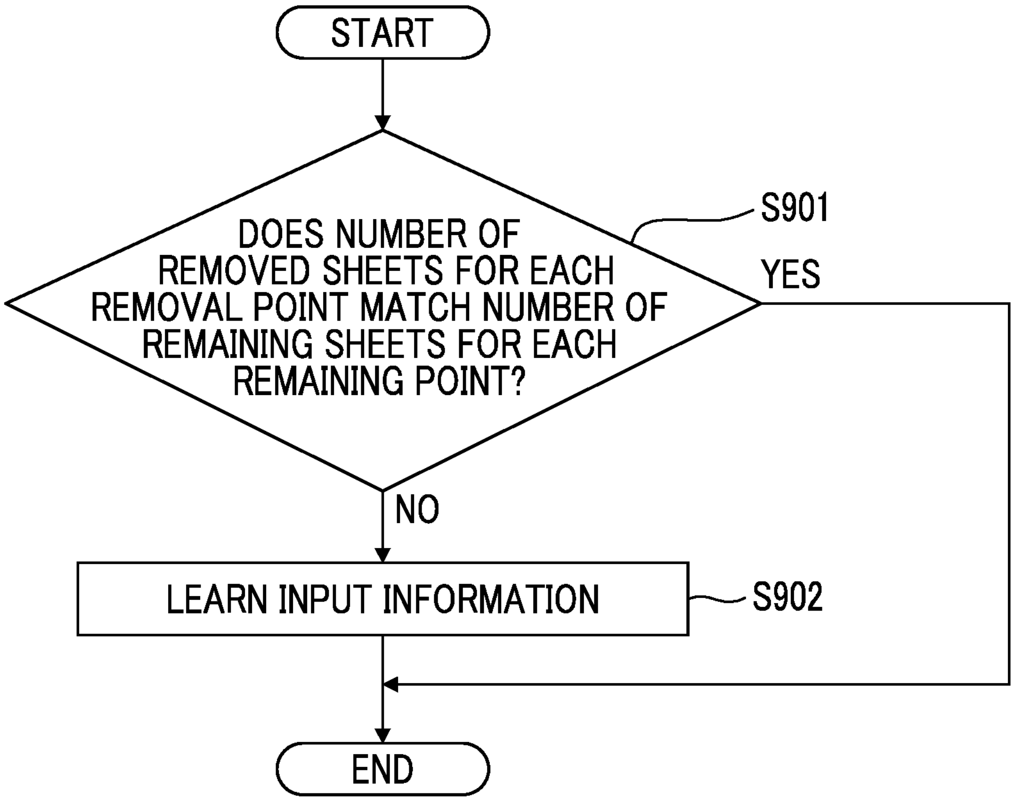
FIG. 20 is a flow diagram showing a flow of processing of feeding back input information.

FIG. 20 is a flowchart showing a flow of processing of feeding back input information.

FIG. 20 shows a case where the number of removed sheets for each removal point is input by the user and the removal of the residual paper P is determined to be completed, as an example.

First, the jam elimination information DB 218 determines whether or not the number of removed sheets for each removal point matches the number of remaining sheets for each remaining point (S901).

Specifically, the jam elimination information DB 218 compares the number of removed sheets for each removal point included in the input information input by the user with the number of remaining sheets for each remaining point included in the prediction information predicted by the residual paper grasping unit 215 to determine whether or not the number of removed sheets matches the number of remaining sheets.

In a case where the number of removed sheets for each removal point does not match the number of remaining sheets for each remaining point (NO in S901), the jam elimination information DB 218 learns the input information (S902) and ends the processing. In other words, the jam elimination information DB 218 performs machine learning of the removal point and the number of removed sheets included in the input information input by the user, and ends the processing. The input information included in the jam elimination information may be updated with newly acquired input information, and the processing may end.

Specifically, the identification information of the print job in which the jam has occurred holds the jam information for specifying the jam and the jam elimination information associated with the input information input by the user in a case where the jam is eliminated.

In S901, in a case where the number of removed sheets for each removal point matches the number of remaining sheets for each remaining point (YES in S901), the jam elimination information DB 218 ends the processing without the learning of the input information.

The program executed by the CPU 21*a* as an example of the processor in each exemplary embodiment may be provided to the information processing apparatus 20 in a state of being stored in a computer readable recording medium, such as a magnetic recording medium (magnetic tape, magnetic disk, or the like), an optical recording medium (optical disk or the like), an optical magnetic recording medium, or a semiconductor memory. The program executed by the CPU 21*a* may be provided to the information processing apparatus 20 by using a communication section such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the information processing system in each exemplary embodiment is prepared as, for example, a program such as application software. The program can be provided not only by section of communication but also by storing the program in a recording medium such as a CD-ROM.

Supplementary Note (((1)))

An image forming apparatus comprising:

a transport section that transports a recording material;

a grasping section that grasps a remaining situation of a recording material remaining in a transport path through which the recording material is transported by the transport section;

a reception section that receives, from a user, an input of the number of removed sheets of recording material removed from the transport path by the user in a case where the transport of the recording material by the transport section is stopped; and a start section that starts the stopped transport by the transport section based on the number of removed sheets input by the user.

(((2)))

The image forming apparatus according to (((1))), wherein the grasping section grasps, as the remaining situation, the number of remaining sheets of recording material remaining in the transport path and a remaining point of the transport path where the recording material remains, the reception section receives, from the user, an input of a removal point where the user removes the recording material together with the number of removed sheets, and the start section starts the stopped transport based on the remaining situation grasped by the grasping section and input information received by the reception section.

(((3)))

The image forming apparatus according to (((2))), wherein the start section starts the stopped transport in a case where the number of removed sheets for each classification of the removal point matches the number of remaining sheets for each classification of the remaining point.

(((4)))

The image forming apparatus according to (((2))), wherein the start section starts the stopped transport in a case where the number of removed sheets for each removal point matches the number of remaining sheets for each remaining point.

(((5)))

The image forming apparatus according to (((4))), wherein the start section starts the stopped transport in a case where a predetermined condition is satisfied in a state where the number of removed sheets matches the number of remaining sheets and the removal point does not match the remaining point.

(((6)))

The image forming apparatus according to any one of (((1))) to (((5))), wherein the grasping section grasps, as the remaining situation, the number of remaining sheets of recording material remaining in the transport path, and the start section starts the stopped transport based on the number of removed sheets and the number of remaining sheets.

(((7)))

The image forming apparatus according to (((6))), wherein the start section starts the stopped transport in a case where the number of removed sheets matches the number of remaining sheets.

(((8)))

The image forming apparatus according to (((1))) and (((6))) or (((7))), wherein the grasping section grasps, as the remaining situation, the number of remaining sheets of recording material remaining in the transport path and a range of the transport path that the user reaches, which is a remaining range where the recording material remains, the reception section receives, from the user, an input of a removal range where the user removes the recording material together with the number of removed sheets, and the start section starts the stopped transport in a case where the number of removed sheets for each removal range matches the number of remaining sheets for each remaining range.

(((9)))

The image forming apparatus according to any one of (((1))) to (((8))), further comprising:

a display control section that displays a screen for receiving the input of the number of removed sheets from the user, wherein the display control section displays the screen, together with the number of removed sheets, such that an input of a removal point where the user removes the recording material is received from the user.

(((10)))

The image forming apparatus according to (((9))), wherein the display control section displays, on the screen, information indicating the remaining situation grasped by the grasping section.

(((11)))

The image forming apparatus according to any one of (((1))) to (((10))), wherein the grasping section grasps the remaining situation of the recording material based on transport information of the recording material transported by the transport section.

(((12)))

The image forming apparatus according to any one of (((1))) to (((11))), further comprising:

a holding section that holds information used in a case where the start section starts the transport, which is input information received by the reception section, in correspondence with a transport condition in a case where the transport is stopped, wherein the holding section holds, in a case where the input information includes the number of removed sheets and a removal point where the user removes the recording material, the removal point in correspondence with the transport condition in a case where the transport is stopped, and the grasping section grasps, in a case where the transport is stopped again under the transport condition, the number of remaining sheets of recording material remaining in the transport path and a point, as a remaining point of the transport path where the recording material remains, based on the removal point in correspondence with the transport condition.

(((13)))

The image forming apparatus according to (((12))), wherein the holding section assigns priority based on the removal point in correspondence with the transport condition to each point of the transport path, and the grasping section grasps the remaining point according to the priority.

(((14)))

An image forming apparatus comprising:

a transport section that transports a recording material;

a grasping section that grasps the number of remaining sheets of recording material remaining in a transport path through which the recording material is transported by the transport section;

a display control section that displays, in a case where the transport of the recording material by the transport section is stopped, a screen for receiving, from the user, an input of the number of removed sheets of recording material removed from the transport path by the user; and a control section that performs, in a case where the number of removed sheets input by the user is less than the number of remaining sheets, control of not starting the stopped transport by the transport section.

(((15)))

An information processing system comprising:

one or more processors configured to:

acquire, in a case where a transport apparatus that transports a recording material stops the transport of the recording material, information including the number of removed sheets of recording material removed from the transport apparatus by a user, which is input information input by the user; and start the stopped transport based on the input information.

(((16)))

The information processing system according to (((15))), wherein the one or more processors are configured to:

acquire prediction information including the number of remaining sheets of recording material remaining in the transport apparatus, which is information predicted based on transport information of the recording material transported by the transport apparatus; and start the stopped transport based on the input information and the prediction information.

(((17)))

The information processing system according to (((15))) or (((16))), wherein the one or more processors are configured to:

provide the input information used in a case where the stopped transport by the transport apparatus is started to another apparatus different from the transport apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a transport section that transports a recording material; and a processor, configured to:

grasp a remaining situation comprising the number of remaining sheets of recording material remaining in a transport path through which the recording material is transported by the transport section and a remaining point of the transport path where the recording material remains;

receive, from a user, an input of the number of removed sheets of recording material removed from the transport path by the user and a removal point where the user removes the recording material in a case where the transport of the recording material by the transport section is stopped; and start the stopped transport by the transport section based on the remaining situation and input information of the input received from the user.

2. The image forming apparatus according to claim 1, wherein the processor starts the stopped transport in a case where the number of removed sheets for each classification of the removal point matches the number of remaining sheets for each classification of the remaining point.

3. The image forming apparatus according to claim 2, wherein the processor grasps the remaining situation of the recording material based on transport information of the recording material transported by the transport section.

4. The image forming apparatus according to claim 1, wherein the processor starts the stopped transport in a case where the number of removed sheets for each removal point matches the number of remaining sheets for each remaining point.

5. The image forming apparatus according to claim 4, wherein the processor starts the stopped transport in a case where a predetermined condition is satisfied in a state where the number of removed sheets matches the number of remaining sheets and the removal point does not match the remaining point.

6. The image forming apparatus according to claim 5, wherein the processor grasps the remaining situation of the recording material based on transport information of the recording material transported by the transport section.

7. The image forming apparatus according to claim 4, wherein the processor grasps the remaining situation of the recording material based on transport information of the recording material transported by the transport section.

8. The image forming apparatus according to claim 1, the processor starts the stopped transport based on the number of removed sheets and the number of remaining sheets.

9. The image forming apparatus according to claim 8, wherein the processor starts the stopped transport in a case where the number of removed sheets matches the number of remaining sheets.

10. The image forming apparatus according to claim 1, wherein the processor further grasps, as the remaining situation, the number of remaining sheets of recording material remaining in the transport path and a range of the transport path that the user reaches, which is a remaining range where the recording material remains, the processor receives, from the user, an input of a removal range where the user removes the recording material together with the number of removed sheets, and the processor starts the stopped transport in a case where the number of removed sheets for each removal range matches the number of remaining sheets for each remaining range.

11. The image forming apparatus according to claim 1, wherein the processor is further configured to:

display a screen for receiving the input of the number of removed sheets from the user, wherein the processor displays the screen, together with the number of removed sheets, such that the input of the removal point where the user removes the recording material is received from the user.

12. The image forming apparatus according to claim 11, wherein the processor displays, on the screen, information indicating the remaining situation.

13. The image forming apparatus according to claim 1, wherein the processor grasps the remaining situation of the recording material based on transport information of the recording material transported by the transport section.

14. The image forming apparatus according to claim 1, further comprising:

a memory that holds information used in a case where the start section starts the transport, which is the input information received from the user, in correspondence with a transport condition in a case where the transport is stopped, wherein the memory holds, in a case where the input information includes the number of removed sheets and the removal point where the user removes the recording material, the removal point in correspondence with the transport condition in a case where the transport is stopped, and the processor grasps, in a case where the transport is stopped again under the transport condition, the number of remaining sheets of recording material remaining in the transport path and a point, as the remaining point of the transport path where the recording material remains, based on the removal point in correspondence with the transport condition.

15. The image forming apparatus according to claim 14, wherein the memory assigns priority based on the removal point in correspondence with the transport condition to each point of the transport path, and the processor grasps the remaining point according to the priority.

16. An information processing system comprising:

one or more processors configured to:

acquire, in a case where a transport apparatus that transports a recording material stops the transport of the recording material, information including the number of removed sheets of recording material removed from the transport apparatus by a user, which is input information input by the user;

acquire prediction information including the number of remaining sheets of recording material remaining in the transport apparatus, which is information predicted based on transport information of the recording material transported by the transport apparatus; and start the stopped transport based on the input information and the prediction information.

17. The information processing system according to claim 16, wherein the one or more processors are configured to:

provide the input information used in a case where the stopped transport by the transport apparatus is started to another apparatus different from the transport apparatus.

* * * * *